(12) United States Patent
Suenaga et al.

(10) Patent No.: US 7,385,466 B2
(45) Date of Patent: Jun. 10, 2008

(54) DIFFERENTIAL TRANSMISSION CIRCUIT AND COMMON MODE CHOKE COIL

(75) Inventors: Hiroshi Suenaga, Osaka (JP); Osamu Shibata, Nishinomiya (JP); Yoshiyuki Saito, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 237 days.

(21) Appl. No.: 11/085,078

(22) Filed: Mar. 22, 2005

(65) Prior Publication Data

US 2005/0219006 A1     Oct. 6, 2005

(30) Foreign Application Priority Data

Mar. 30, 2004 (JP) .............................. 2004-098930

(51) Int. Cl.
*H03H 7/00* (2006.01)
*H04B 3/28* (2006.01)

(52) U.S. Cl. .................. 333/181; 333/12; 333/177; 336/211; 336/215

(58) Field of Classification Search .................. 333/12, 333/177, 181–185; 336/211, 215
See application file for complete search history.

(56) References Cited

U.S. PATENT DOCUMENTS 4,823,095 A * 4/1989 Atallah et al. ............ 333/22 R
5,095,291 A 3/1992 Staschover et al.
5,659,273 A * 8/1997 Harpham .................. 333/22 R
6,677,829 B2 1/2004 Maki et al.

FOREIGN PATENT DOCUMENTS

JP       2002-261842       9/2002
JP       2003-46655        2/2003
WO       96/04737          2/1996

* cited by examiner

*Primary Examiner*—Robert J. Pascal
*Assistant Examiner*—Kimberly E Glenn
(74) *Attorney, Agent, or Firm*—Wenderoth, Lind & Ponack, L.L.P.

(57) ABSTRACT

A first transmission line for transmitting a first signal and a second transmission line for transmitting a second signal, which has the reverse phase of the first signal, are connected in series with a common mode choke coil. A third transmission line and fourth transmission line are each connected in series with the common mode choke coil, and transmit the first and second signals. A semiconductor device is connected in series with the third and fourth transmission lines, so as to transmit and receive the first and second signals. One end of a first terminator is connected in parallel with the first transmission line, and the other end is connected to the common mode choke coil. One end of a second terminator is connected in parallel with the second transmission line, and the other end is connected to the common mode choke coil. The noise eliminating capability of the common mode choke coil is increased by means of this structure.

3 Claims, 22 Drawing Sheets

DIFFERENTIAL TRANSMISSION CIRCUIT AND COMMON MODE CHOKE COIL

BACKGROUND OF THE INVENTION

1. Field of the Invention

The present invention relates to a differential transmission circuit and a common mode choke coil.

2. Background Information

In recent years there have been increasing demands for the transmission of high-frequency signals in conjunction with the diversification of electronic devices. In general, differential transmission is used for high-frequency signal transmission.

In particular, when differential transmission is applied to the transmission of high-frequency signals, electromagnetic interference affecting external electronic devices can be reduced. Moreover, differential transmission can reduce the effects of electromagnetic interference from external electronic devices.

Consider a case in which there is strong electromagnetic interference from external electronic devices, which affects differential transmission and causes noise to be carried in two transmission signals. When the noise carried in two signals is at such a high level that it exceeds the input range of the differential receiver, there is concern that the differential receiver will be subject to malfunction due to the noise in the two signals. Generally, a common mode choke coil is connected to the input terminal of the differential receiver of the differential transmission circuit in order to eliminate the noise in the signals. A common mode choke coil has the function of eliminating noise. Consequently, noise penetration in the differential receiver is prevented.

The noise suppression capability of the common mode choke coil, that is, the common mode impedance, has frequency characteristics. Therefore, the common mode choke coil cannot have a common mode impedance that is highly uniform in all frequency bands. Since the noise suppression capability is low in the frequency ranges in which the common mode choke coil has low common mode impedance, it is difficult for the common mode choke coil to effectively eliminate noise from the signals when the signals carry noise due to the influence of electromagnetic interference from external electronic devices.

Common mode chokes generate a magnetic field proportional to the common mode current of the noise flowing to the common mode choke coil. When there is substantial noise in the common mode current, the common mode choke coil is susceptible to magnetic flux saturation. As a result, there is a reduction in the noise suppression capability of the common mode choke coil.

To resolve these problems, Japanese Laid-Open Patent Publication No. 2002-261842 discloses a method for reducing the amount of noise flowing to the common mode choke coil using terminators. FIG. 23 is a diagram of the differential transmission circuit described in Japanese Laid-Open Patent Publication No. 2002-261842.

According to this construction, noise in a first signal and a second signal is divided and allocated to first and second terminators 710 and 711, and a common mode choke coil 705. Accordingly, even when the first and second signals are in the low frequency band where the common mode choke coil 705 noise suppression capability is low, noise can be eliminated by reducing the amount of noise flowing in the common mode choke coil 705. Furthermore, the phenomenon of magnetic flux saturation in the common mode choke coil 705 can also be reduced by reducing the amount of common mode current noise flowing to the common mode choke coil 705. Accordingly, the amount of noise reaching the differential receiver 709 is also inevitably reduced even though it cannot be eliminated by the common mode choke coil 705.

Furthermore, in order to avoid a decrease in the noise suppression capability of the common mode choke coil, Japanese Laid-Open Patent Publication No. 2003-046655 discloses a method which uses terminators to reduce the amount of noise flowing to the common mode choke coil, and connects external devices and the transmission lines by means of shielded serial cables. FIG. 24 is a diagram of the differential transmission circuit of Japanese Laid-Open Patent Publication No. 2003-046655.

In this construction, the noise carried by the shield 762 and the noise flowing to the first and second terminators 760 and 761 flow to the common mode choke coil 755. Therefore, the common mode choke coil 755 generates a counter electromotive force relative to the noise from the shield 762 and first and second terminators 760 and 761, and not only relative to the remaining noise flowing to the common mode choke coil 755. Accordingly, the common mode choke coil 755 has a higher noise suppression capability than the method in Japanese Laid-Open Patent Publication No. 2002-261842. Consequently, the amount of noise reaching the differential receiver 759 is reduced even though it cannot be eliminated by the common mode choke coil 755.

However, differential transmissions by these methods present the following problems.

In Japanese Laid-Open Patent Publication No. 2002-261842, when the noise in the first and second signals is so great it cannot be eliminated using the first and second terminators 710 and 711 and the common mode choke coil 705, the noise cannot be eliminated before reaching the tolerance limit of the differential receiver 709. There is therefore concern that the noise may cause malfunction of the differential receiver 709, which may in turn damage the semiconductor device. This phenomenon must be taken into account particularly when using differential transmissions for signal transmission between devices installed in automobiles. FIG. 25 shows an example in which differential transmission is used between devices installed in a vehicle. In addition to an engine, brakes and the like, onboard devices A and B are installed in the automobile shown in FIG. 25. The onboard devices A and B are a car navigation device and audio device or the like. The onboard devices A and B are provided with differential transmission transceivers C and D, respectively. The onboard device A and onboard device B transmit and receive signals using the differential transmission transceivers C and D. The engine produces strong electromagnetic interference. Therefore, the signals transmitted between the onboard devices A and B are affected even when using differential transmission. As a result, there is a high probability that malfunction will occur due to the input noise which cannot be eliminated by the differential receiver within the differential transmission circuit. Furthermore, when differential transmission does not eliminate noise from the transmission signal, the electromagnetic field can cause interference for external devices, and there is a possibility that the braking device and the like may be affected and malfunction. Accordingly, this method is difficult to apply in environments with extremely high levels of electromagnetic interference from external devices as in the case of automobiles.

In Japanese Laid-Open Patent Publication No. 2003-046655, there is increased weight and cost because the transmission line 752 is covered by the shield 762. Particularly when the differential transmission circuit of Japanese Laid-Open Patent Publication No. 2003-046655 is installed in an automobile, the weight of the shielding is 50 to 100 kg. Accordingly, the weight and cost of the shield cannot be ignored.

The present invention solves these problems by providing a differential transmission circuit and common mode choke coil used in same, which improves protection for the differential receiver and eliminates noise by a differential transmission circuit structure that is also light-weight and inexpensive.

SUMMARY OF THE INVENTION

In order to solve these problems, a first aspect of the present invention provides a differential transmission circuit which includes a first transmission line, second transmission line, common mode choke coil, third transmission line, fourth transmission line, semiconductor device, first terminator, and second terminator. The first transmission line transmits a first signal. The second transmission line transmits a second signal which has the reverse phase of the first signal. The common mode choke coil is connected in series with the first transmission line and the second transmission line. The third transmission line is connected in series with the common mode choke coil, and transmits the first signal output from the common mode choke coil. The fourth transmission line is connected in series with the common mode choke coil, and transmits the second signal output from the common mode choke coil. The semiconductor device is connected in series with the third transmission line and the fourth transmission line, and transmits and receives the first signal and second signal. One end of the first terminator is connected in parallel with the first transmission line or third transmission line, and the other end is connected to the common mode choke coil. One end of the second terminator is connected in parallel with the second transmission line or the fourth transmission line, and the other end is connected to the common mode choke coil.

When the differential transmission circuit has this structure, the first signal transmitted through the first transmission line passes through the common mode choke coil. The second signal transmitted through the second transmission line passes through the common mode choke coil. Furthermore, the noise carried in the first and second signals that pass through the first terminator and second terminator flows to the common mode choke coil. Then a counter electromotive force is generated by the noise carried in the first and second signals transmitted through the first transmission line and second transmission line, and a counter electromotive force is generated by the noise of the first and second signals flowing to the common mode choke coil through the first terminator and second terminator. Current corresponding to the generated electromotive force flows to the common mode choke coil and generates lines of magnetic flux, which eliminate the noise. Accordingly, the counter electromotive force generated in the common mode choke coil increases, and the lines of magnetic flux increase even when only signals transmitted through the first transmission line and second transmission line flow to the common mode choke coil. Therefore, there is an increase in the capability for eliminating the signal noise in the common mode choke coil, and inputting a large amount of noise to the semiconductor device can be prevented. Consequently, damage to the semiconductor device caused by excessive noise can be prevented, and signal noise is prevented from affecting other nearby devices.

A second aspect of the present invention provides a differential transmission circuit of the first aspect, in which one end of the first terminator is connected in parallel with the first transmission line, and one end of the second terminator is connected in parallel with the second transmission line.

According to this structure, the majority of the noise of the first and second signals passes through the first and second terminators, and flows to the common mode choke coil. The remaining noise of the first and second signals enters the common mode choke coil and is eliminated. That is, since the majority of the noise of the first and second signals passes through the first and second terminators and enters the common mode choke coil, there is an increase in that part of the counter electromotive force generated in the common mode choke coil. There is, therefore, an increase in the noise elimination capability of the common mode choke coil, and the majority of the noise is prevented from entering the semiconductor device.

A third aspect of the present invention provides a differential transmission circuit of the first aspect, in which one end of the first terminator is connected in parallel with the third transmission line, and one end of the second terminator is connected in parallel with the fourth transmission line.

According to this structure, the first and second signals first enter the common mode choke coil to eliminate noise. Thereafter, the remaining noise of the first and second signals which was not eliminated is output to the third and fourth transmission lines, passes through the first and second terminators, and re-enters the common mode choke coil. In this case, a further counter electromotive force corresponding to the residual noise is generated in the common mode choke coil. Therefore, the common mode choke coil has an increase in noise elimination capability by that part of the further generation of the counter electromotive force. Consequently, the majority of the noise is prevented from entering the semiconductor device. Furthermore, the first and second terminators match the impedances of all the transmission lines. As a result, there is an increase in the noise elimination capability of the common mode choke coil, and signal reflection is prevented so as to allow transmission of stable high-definition signals which have distortion-free signal waveforms.

A fourth aspect of the present invention provides a differential transmission circuit of the third aspect, in which the other end of the first and second terminators is connected to the common mode choke coil from the opposite direction to the transmission direction of the first and second signals.

A coil having one reverse winding may be used in the common mode choke coil of the differential transmission circuit having the structure described above. According to this structure, there is a shorter wiring distance from the other end of the first and second terminators to the common mode choke coil. Consequently, the printed circuit board of the differential transmission circuit has a simpler design.

A fifth aspect of the present invention provides a differential transmission circuit of the second aspect, which further includes a third terminator connected in parallel with the third transmission line, and a fourth terminator connected to the fourth transmission line.

The third terminator and fourth terminator match the impedances of the third and fourth transmission lines. Accordingly, the first and second signal reflection phenomenon is prevented, the first and second signals which have been stabilized for high definition can be transmitted distortion-free signal waveforms. Furthermore, this structure is even effective when noise carried in the first and second signals is so great it cannot be eliminated by the structure of the second aspect. When the noise of the first and second signals is so great it cannot be eliminated by the first and second terminators and common mode choke coil, the residual noise which cannot be eliminated from the first and second signals passes through the third and fourth transmission lines and is input to the semiconductor device. In this case, the third and fourth terminators are respectively connected in parallel with the third and fourth transmission lines. The noise carried by the first and second signals, which have passed through the common mode choke coil, passes through the third and fourth terminators and flows to the stable potential. According to this structure, the noise of the first and second signals is eliminated, and signals stabilized for high definition can be transmitted.

A sixth aspect of the present invention provides a differential transmission circuit of the third aspect, which further includes a third terminator connected in parallel with the first transmission line, and a fourth terminator connected in parallel with the second transmission line.

This structure is effective when the common mode choke coil is subjected to magnetic flux saturation by the noise of the first and second signals. In this case, the third and fourth terminators are inserted in parallel in the first and second transmission lines. First, magnetic flux saturation of the common mode choke coil is prevented because the majority of the noise carried in the first and second signals flows to the third and fourth terminators. The residual noise in the first and second signals flows to the common mode choke coil, and the residual noise which is not eliminated by the common mode choke coil flows to the first and second terminators. Residual noise remaining in the first and second signal after passing through the first and second terminators is input to the common mode choke coil. Since the common mode choke coil generates a further counter electromotive force corresponding to the input residual noise, the noise elimination capability of the common mode choke coil is increased. Moreover, the first through fourth terminators match the impedances across all the transmission lines. According to this structure, the noise of the first and second signals is eliminated, and signals stabilized for high definition can be transmitted.

A seventh aspect of the present invention provides a differential transmission circuit of any one of the first to sixth aspects, in which a first paired transmission line, which includes the first transmission line and the second transmission line, is covered by a first shield, and the first shield is connected to the common mode choke coil.

Noise flowing through the first paired transmission line is carried to the first shield. Since the first shield is connected to the common mode choke coil, the signal noise of the first shield is input to the common mode choke coil. Then, there is a further generation of a counter electromotive force corresponding to the signal noise flowing from the first shield to the common mode choke coil. Accordingly, there is a further increase in the noise elimination capability of the common mode choke coil since the counter electromotive force is reinforced by the noise from the first shield even more than in the first to sixth aspects. That is, the noise of the first shield is used effectively in this structure. Accordingly, excessive noise is prevented from entering the semiconductor device, and signal noise is prevented from affecting other nearby devices.

An eighth aspect of the present invention provides a differential transmission circuit of the seventh aspect, and has the following characteristics. A fifth transmission line is connected in series with the common mode choke coil, and transmits a third signal. A sixth transmission line is connected in series with the common mode choke coil, and transmits a fourth signal having the reverse phase of the third signal. A seventh transmission line is connected in series with the common mode choke coil and the semiconductor device, and transmits the third signal output from the common mode choke coil. An eighth transmission line is connected in series with the common mode choke coil and the semiconductor device, and transmits the fourth signal output from the common mode choke coil. A second paired transmission line, which includes the fifth transmission line and sixth transmission line, is covered by a first shield. The first paired transmission line and the second paired transmission line are covered by a second shield. The second shield is further connected to the common mode choke coil.

Signal noise flowing through the first paired transmission line and second paired transmission line is carried to the first shield and second shield. Since the second shield is further connected to the common mode choke coil, the signal noise of the second shield is input to the common mode choke coil. Then, there is a further generation of a counter electromotive force corresponding to the signal noise flowing from the second shield to the common mode choke coil. Accordingly, there is a further increase in the noise elimination capability of the common mode choke coil due to the reinforcement of the counter electromotive force by the noise from the second shield. That is, the noise of the first shield and second shield is used effectively in this structure. Consequently, excessive noise is prevented from entering the semiconductor device, and signal noise is prevented from affecting other nearby devices.

A ninth aspect of the present invention provides a differential transmission circuit of the first aspect, in which the common mode choke coil includes a magnetic body, and N number of leads (where N is a positive integer) wound on the magnetic body.

This structure has the same effectiveness as that noted above for the first aspect of the present invention.

A tenth aspect of the present invention provides a differential transmission circuit of the ninth aspect, in which the N number of leads is three leads, a first layer is formed by winding two leads among the three leads on the surface of the magnetic body, and a second layer is formed by winding the remaining lead among the three leads on top of the leads forming the first layer; the two leads transmit a first signal and a second signal which have mutually reverse phases, and the remaining lead forming the second layer is connected to a stable electric potential, and the center of the cross section of the remaining lead forming the second layer is everywhere equidistant from the centers of the cross section of the two leads forming the first layer.

For example, when the stable electric potential is a ground, the impedance of each lead relative to the ground is equal and stable. Accordingly, excellent signal quality can be maintained during transmission. Since the characteristic impedances are stably matched, this structure is also applicable to the transmission of high frequency signals.

An eleventh aspect of the present invention provides a differential transmission circuit of the ninth aspect, in which one of the leads and the remaining leads of the common mode choke coil are wound in a mutually opposite direction.

A common mode choke coil having this structure is excellent for use as the common mode choke coil in the differential transmission circuit disclosed in the fourth aspect. Since the remaining lead is connected to the first and second terminators from the signal output side, the wiring between the first and second terminators to the common mode choke coil can be shortened.

A twelfth aspect of the present invention provides a common mode choke coil which includes a magnetic body, and four leads wound on the magnetic body. This common mode choke coil provides four leads wound on the surface of the magnetic body, wherein two leads among the four leads are connected to signal lines for transmitting differential signals, and the remaining two leads are connected to a stable electric potential, and the two leads connected to the signal lines are interposed between the two leads connected to a stable electric potential.

For example, the stable potential may be a ground. Depending on the lead winding direction, the leads connected to the two signal lines for transmitting differential signals having mutually reverse phases are normally adjacent leads. The two leads connected to the signal lines are arranged side-by-side sandwiched between the two leads connected to the ground. There is, therefore, a stable match in impedances between the leads connected to the pair of signal lines and the leads connected to the ground. Accordingly, excellent signal quality is maintained during transmission.

A thirteenth aspect of the present invention provides a common mode choke coil which includes a magnetic body, and four leads wound on the magnetic body. The common mode choke coil provides two leads among the four leads connected to signal lines for transmitting differential signals, and the remaining two leads connected to a stable electric potential, and the four leads are wound on the surface of the magnetic body with the leads connected to the signal lines and the leads connected to a stable electric potential alternatingly arranged.

This structure is suitable for pseudo differential transmissions such as high-definition multimedia interface (HDMI) and the like. Pseudo differential transmission is a transmission method in which a differential driver alternatingly outputs normal phase and reverse phase differential signals. When the stable potential is, for example, a ground, each conductor connected to a signal line is an adjacent lead to each conductor connected to the ground. Therefore, each lead connected to a signal line can be strongly coupled to the ground return path of the mutually reverse-phase differential signals, and electromagnetic noise can be suppressed. Furthermore, since there is a stable match of the impedances between the leads connected to the ground and the leads connected to the pair of signal lines, excellent signal quality can be maintained during transmission.

A fourteenth aspect of the present invention provides an audio-video transceiver for in-vehicle installation connected to an output device, in which the audio-video transceiver includes the differential transmission circuit of the first aspect, and a control means for outputting a signal transmitted from the differential transmission circuit to the output device.

The differential transmission circuit of the first aspect transmits first and second signals from which noise has been eliminated by increasing the signal noise eliminating capability of the common mode choke coil. Furthermore, the differential transmission circuit of the first aspect can prevent electromagnetic interference from reaching other devices without shielding the transmission lines. Accordingly, the differential transmission circuit of the first aspect may be applied to an audio-video transceiver between AV devices and the like installed in and automobile. Consequently, video audio having excellent image quality and sound quality can be transmitted and received since noise is eliminated even when other devices such as, for example, the engine, produce electromagnetic interference. Moreover, since electromagnetic interference which might affect other devices is eliminated, there is no adverse affect on the engine and brake system of the automobile, and safety is enhanced. Additionally, since the differential transmission circuit does not use shields, the automobile is lighter in weight.

When using the differential transmission circuit of the present invention, the counter electromotive force generated in the common mode choke coil is reinforced by means of a circuit structure which is both inexpensive and light weight. Accordingly, common mode noise can be eliminated and protection of the differential receiver improved even when there is excessive noise from external devices.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Differential Transmission Circuit

The differential transmission circuit of the present invention is described in detail below-with reference to FIGS. 1 through 15.

(1) First Embodiment

Figure 1:
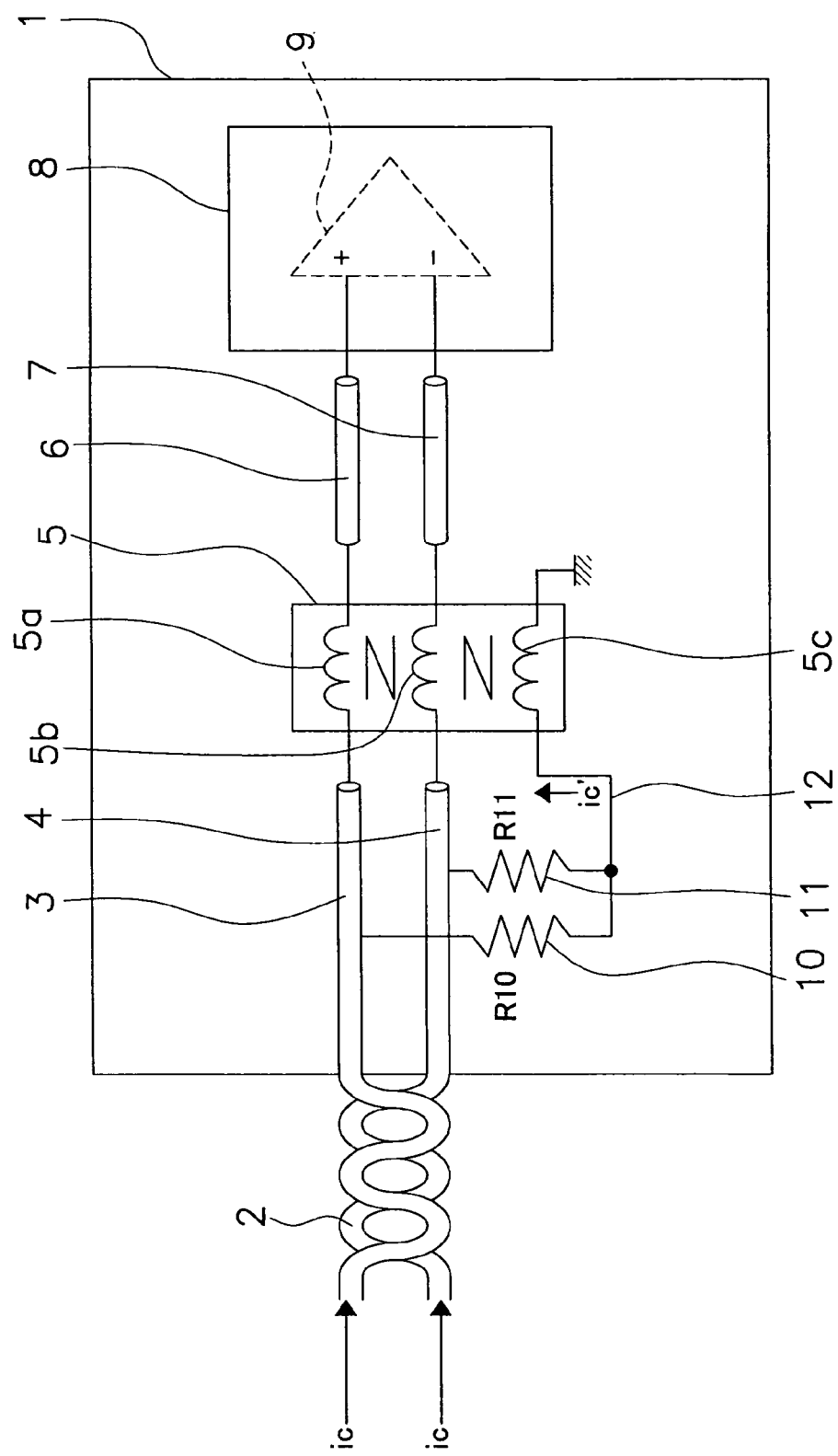
FIG. 1 is a diagram of a first embodiment of a differential transmission circuit.

FIG. 1 is a diagram of a first embodiment of the differential transmission circuit of the present invention. This differential transmission circuit is used in devices installed in vehicles such as, for example, car navigation devices and audio devices and the like, to transmit signals between on-board devices.

The differential transmission circuit 1 of FIG. 1 includes a first transmission line 3, second transmission line 4, third transmission line 6, fourth transmission line 7, common mode choke coil 5, semiconductor device 8, first terminator 10, and second terminator 11. The first transmission line 3 and second transmission line 4 are connected to a paired transmission line in the form of a line from outside the differential transmission circuit 1, so as to connect the differential transmission circuit 1 with external electronic devices. The first transmission line 3 transmits a first signal received from an external electronic device, and the second transmission line 4 transmits a second signal received from an external electronic device. The first and second signals have mutually reverse phases. The common mode choke coil 5 has three leads 5a, 5b, 5c, which are all wound in the same direction. One end of the lead 5a is connected in series with the first transmission line 3, and one end of the lead 5b is connected in series with the second transmission line 4. The other end of the lead 5a is connected in series with the third transmission line 6, and the other end of the lead 5b is connected in series with the fourth transmission line 7. One end of the lead 5c is connected to the first terminator 10 and second terminator 11, and the other end is connected to a ground. The semiconductor device 8 includes a differential receiver 9 for receiving signals. The differential receiver 9 is connected in series with the third transmission line 6 and fourth transmission line 7. Therefore, the first signal is input to the differential receiver 9 through the first transmission line 3, lead 5a, and third transmission line 6. The second signal is input to the differential receiver 9 through the second transmission line 4, lead 5b, and fourth transmission line 7.

One end of the first terminator 10 is connected in parallel with the first transmission line 3. One end of the second terminator 11 is connected in parallel with the second transmission line 4. The other end of the first terminator 10 and the other end of the second terminator 11 are connected in parallel with the lead 5c of the common mode choke coil 5.

Although FIG. 1 shows the differential transmission circuit 1 using only single terminators for the first terminator 10 and second terminator 11, respectively, a plurality of terminators may be used for the terminators. The differential receiver 9 for receiving signals is provided in the semiconductor device 8 in the differential transmission circuit 1, however, a differential driver for transmitting signals may also be provided. The electric potential connected to the other end of the lead 5c is not specifically limited, and may be a stable potential such as a ground.

The terminators are not limited to resistors, inasmuch as the terminators may also be capacitors and coils.

Finally, a capacitor also may be provided in series between the terminators 10 and 11 and the lead 5c of the common mode choke coil 5, or between the lead 5c and the ground. Consequently, current consumption through the transmission line can be suppressed.

The modes of eliminating noise included in the first signal and second signal in the differential transmission circuit 1 of FIG. 1 are described below. In the following discussion, the amount of signal noise carried in a signal input to the transmission circuit from an external electronic device, that is, the total common mode current, is designated 100%.

The first and second signals from an external electronic device are first input to the first transmission line 3 and second transmission line 4, respectively, in the differential transmission circuit 1. The first and second signals flow within the first transmission line 3 and second transmission line 4. The first signal reaches the branch point of the first transmission line 3 and the first terminator 10, and the second signal reaches the branch point of the second transmission line 4 and the second terminator 11. Then, the majority of the noise in the first signal flows to the first terminator 10. The majority of the noise in the second signal flows to the second terminator 11. The noise of the first signal and second signal which has flowed to the first and second terminators 10 and 11 is, for example, 80%, respectively. Next, the residual 20% of the noise of the first signal is input to the common mode choke coil 5. The residual 20% of the noise of the second signal is input to the common mode choke coil 5.

The 80% of the noise of the first and second signals flowing to the first terminator 10 and second terminator 11 is input to the common mode choke coil 5 through the first terminator 10 and second terminator 11.

Common mode choke coils generally eliminate noise by generating a counter electromotive force by means of the input noise. The generated counter electromotive force is reinforced as more noise is input to the common mode choke coil, so as to increase the capability to eliminate noise. In the present embodiment, that part of the noise which is eliminated by the first and second terminators 10 and 11 is input to the common mode choke coil 5, and the majority of the noise is input to the common mode choke coil 5. Specifically, the noise and its input paths to the common mode choke coil 5 includes two sources of noise and two input paths in the present embodiment.

(a) The noise input directly from the first and second transmission lines 3 and 4 to the common mode choke coil 5 without flowing to the first and second terminators 10 and 11 is 20% of the noise.

(b) The noise of the first and second signals which flows through the first and second terminators 10 and 11 is 80% of the noise.

That is, 100% of the noise from path (a) and path (b) is input to the common mode choke coil 5. This means that 5-fold more counter electromotive force is generated compared to noise input only input from path (a).

The first and second signals, from which noise has been eliminated in the common mode choke coil 5, are input to the differential receiver 9. An electromotive force corresponding to 100% of the noise is generated in the common mode choke coil 5 despite that only 20% of the noise is carried in the first and second signals input to the common mode choke coil 5. Accordingly, the common mode choke coil 5 can eliminate noise from the input first and second signals.

Consequently, the common mode choke coil 5 outputs the first signal from which noise has been removed to the third transmission line 6, and outputs the second signal to the fourth transmission line 7. Then, the first and second signals from which the noise has been removed pass through the third and fourth transmission lines 6 and 7, respectively, and are input to the differential receiver 9.

Consider a case in which the amount of noise input to the common mode choke coil 5 exceeds the tolerance limit and magnetic flux saturation occurs. Specifically, although the common mode choke coil 5 should generate a counter electromotive force corresponding to 100% of the input noise, a counter electromotive force corresponding to only 80% of the noise is generated due to magnetic flux saturation in the common mode choke coil 5. However, since 20% of the noise is to be eliminated by the common mode choke coil 5, there is a 60% surplus in the noise elimination capability of the common mode choke coil 5. Accordingly, the noise can be eliminated even when the common mode choke coil 5 is saturated.

Since noise eliminated by the first and second terminators 10 and 11 is ultimately input to the common mode choke coil 5 when the structure of the present embodiment is used, a counter electromotive force corresponding to the total of all the original noise carried in the first and second signals is generated in the common mode choke coil 5. Therefore, the noise eliminating capability of the common mode choke coil 5 is increased, and malfunction of the differential receiver 9 is prevented as when noise exceeding the tolerance limit of the differential receiver 9 is input to the differential receiver 9.

Accordingly, the residual noise of the first and second signals input to the semiconductor device is eliminated, such that malfunction of the differential receiver 9 and damage to the semiconductor device are prevented. Also prevented is any influence of signal noise from external electronic devices.

The differential transmission circuit 1 of the present embodiment may, as much as possible, reduce the length of the wiring between the common mode choke coil 5 and differential receiver 9, that is, the length of the third transmission line 6 and fourth transmission line 7. The influence of unmatched impedances generated by the stub wiring of the third transmission line 6 and fourth transmission line 7 can be ignored by shortening as far as possible the distance between the common mode choke coil 5 and differential receiver 9. Accordingly, there is scant signal reflection generated even when the impedances of the third and fourth transmission lines 6 and 7 are not matched, such that high quality signals with distortion-free signal waveforms can be stably transmitted.

(2) Second Embodiment

Figure 2:
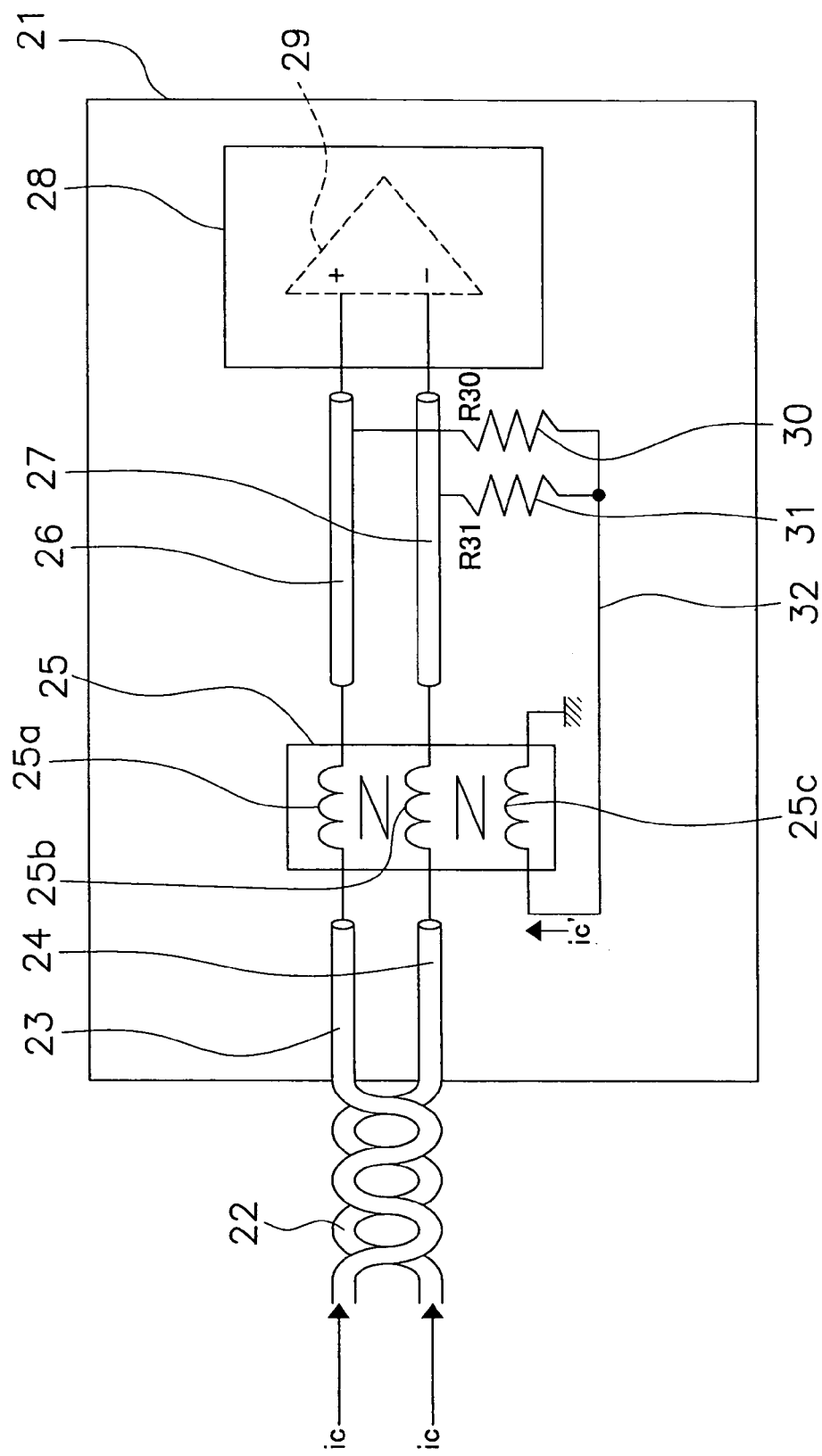
FIG. 2 is a diagram of a second embodiment of a differential transmission circuit.

FIG. 2 is a diagram of a differential transmission circuit of a second embodiment of the present invention. The differential transmission circuit 21 of this embodiment is applicable to cases in which the length of the third and fourth transmission lines 26 and 27 is longer than the third and fourth transmission lines 6 and 7 of the first embodiment.

The differential transmission circuit 21 of FIG. 2 has one end of the first terminator 30 and second terminator 31 connected in parallel with the third transmission line 26 and fourth transmission line 27, respectively. The other end of the first terminator 30 and second terminator 31 is connected to one end of a lead 25c of the common mode choke coil 25 from the signal transmission direction side. The other end of the lead 25c is connected to a ground. In other respects the structure of the differential transmission circuit 21 is identical to that of the first embodiment. That is, a first transmission line 23 for transmitting a first signal and a second transmission line 24 for transmitting a second signal are connected in series with one end of the leads 25a and 25b, respectively, of the common mode choke coil 25. The other end of the leads 25a and 25b of the common mode choke coil 25 is connected in series with the third transmission line 26 and fourth transmission line 27, respectively. The first signal and second signal have mutually reverse phases. The leads 25a, 25b, and 25c are all wound in the same direction. The third transmission line 26 transmits the first signal output from the common mode choke coil 25. The fourth transmission line 27 transmits the second signal output from the common mode choke coil 25. A differential receiver 29 of a semiconductor device 28 is connected in series with the third transmission line 26 and the fourth transmission line 27.

Although FIG. 2 shows the differential transmission circuit 21 using only single terminators for the first terminator 30 and second terminator 31, respectively, a plurality of terminators may be used for the terminators. The differential receiver 29 for receiving signals is provided in the semiconductor device 28 in the differential transmission circuit 21, however, a differential driver for transmitting signals may also be provided. The electric potential connected to the other end of the lead 25c is not specifically limited, and may be a stable potential such as a ground.

The modes of eliminating noise included in the first signal and second signal in the differential transmission circuit 21 of FIG. 2 are described below. In the following discussion, the amount of signal noise carried in a signal input to the transmission circuit from an external electronic device, that is, the total common mode current, is designated 100%.

The first and second signals from an external electronic device are first input to the first transmission line 23 and second transmission line 24, respectively, in the differential transmission circuit 21. The first and second signals flow through the first transmission line 23 and second transmission line 24 and are input to the common mode choke coil 25. Then, a counter electromotive force is generated in the common mode choke coil 25 which corresponds to 100% of the input noise of the first and second signals, so as to produce a noise eliminating capability. The common mode choke coil 25 eliminates 80% of the noise carried in the first and second signals. The first and second signals containing the residual 20% of the noise are output from the common mode choke coil 25, and input to the third transmission line 26 and fourth transmission line 27, respectively.

The first signal reaches the branch point of the third transmission line 26 and the first terminator 30, and the second signal reaches the branch point of the fourth transmission line 27 and the second terminator 31. Then, the 20% residual noise in the first signal flows to the first terminator 30 and is input to the common mode choke coil 25.

Similarly, the 20% residual noise in the second signal flows to the second terminator 31, and is input to the common mode choke coil 25.

This time, the noise and its input paths to the common mode choke coil 25 includes two sources of noise and two input paths in the present embodiment.

(a) The noise input directly from the first and second transmission lines 23 and 24 is 100% of the noise.

(b) The noise input through the first and second terminators 30 and 31 is 20% of the noise.

The common mode choke coil 25 generates a counter electromotive force corresponding to the noise from path (b) in addition to that from path (a). That is, the common mode choke coil 25 receives 120% of the noise from path (a) and path (b). This means that 1.2-fold more counter electromotive force is generated compared to noise input only input from path (a).

Since the noise eliminating capability of the common mode choke coil 25 is increased even if there is a loss of counter electromotive force, less noise is input to the differential receiver 29 compared to when the first and second terminators 30 and 31 are connected directly to a stable potential.

In the present embodiment, the length of the third and fourth transmission lines 26 and 27 may be longer than the length of the third and fourth transmission lines 6 and 7 of the first embodiment. Accordingly, the impedances of the third and fourth transmission lines 26 and 27 cannot be ignored, and the signals are affected. The signal waveform is distorted by the signal reflection phenomenon, and the signal with the distorted signal waveform is input to the differential receiver 29. This causes concern of malfunction of the differential receiver 29 similar to that caused by noise in the signal. In the present embodiment, the resistance value of the first terminator 30 is adjustable so as to match the impedances of all the transmission lines carrying the transmission of the first signal, including the third transmission line 26. The resistance value of the second terminator 31 is also adjustable so as to match the impedances of all transmission lines carrying the transmission of the second signal, including the fourth transmission line 27. Even when the third and fourth transmission lines 26 and 27 are long, the signal reflection phenomenon is prevented and distortion-free signal waveforms can be transmitted.

Consequently, the first and second signals from which noise has been eliminated and the reflection phenomenon has been prevented are input to the differential receiver 29.

In the present embodiment, the impedances of the third and fourth transmission lines 26 and 27 are matched by the first and second terminators 30 and 31 when the length of the third and fourth transmission lines 26 and 27 are longer than the third and fourth transmission lines 6 and 7 of the first embodiment. Residual noise of the first and second signals, which remains after the signals have passed through the common mode choke coil 25, passes through the first and second terminators 30 and 31 and is input to the common mode choke coil 25, so as to increase the noise eliminating capability of the common mode choke coil 25. Since the first and second signals, which have less noise compared to when the first and second terminators 30 and 31 are not provided, are input to the common mode choke coil 25, malfunction of the differential receiver 29 is avoided, and damage to the semiconductor device is prevented. The influence of signal noise from external electronic devices is also prevented. High quality signals with distortion-free signal waveforms can be stably transmitted.

(3) Third Embodiment

Figure 3:
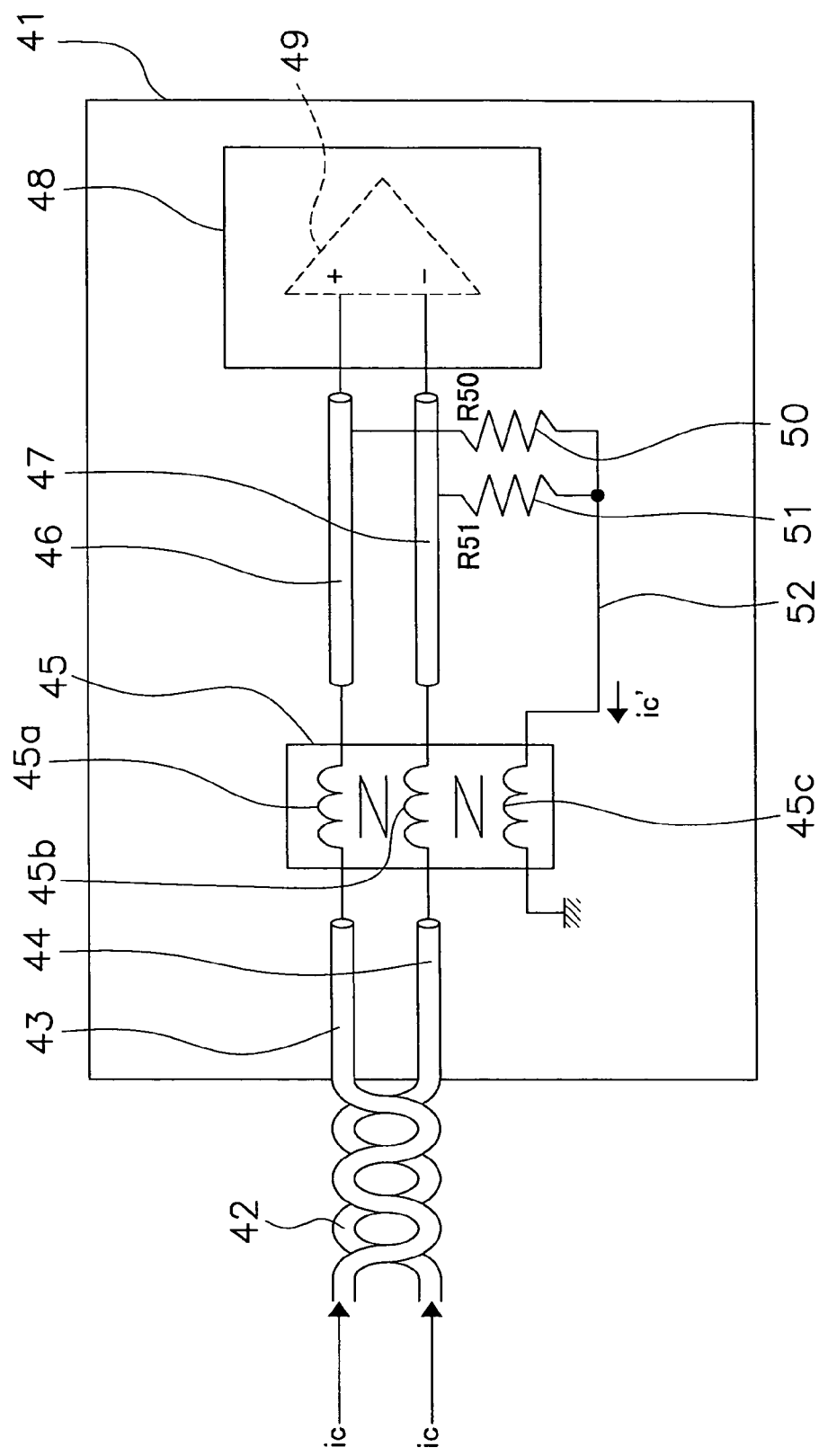
FIG. 3 is a diagram of a third embodiment of a differential transmission circuit.

FIG. 3 is a diagram of a differential transmission circuit of a third embodiment of the present invention. The differential transmission circuit 41 of this embodiment is applicable to cases in which the length of the third and fourth transmission lines 46 and 47 is longer than the third and fourth transmission lines 6 and 7 of the first embodiment, similar to the differential transmission circuit 21 of the second embodiment.

The differential transmission circuit 41 of FIG. 3 differs in two respects from the structure of the second embodiment, as described below. First, the first and second terminators 50 and 51 are connected to one end of the lead 45c of the common mode choke coil 45 from the opposite side relative to the signal transmission direction. Secondly, the lead 45c of the common mode choke coil is wound in the opposite direction relative to the other leads a and b. The other end of the lead 45c is connected to a ground.

Other aspects of the structure of the differential transfer circuit 41 are identical to that of the second embodiment. That is, the first transmission line 43 for transmitting a first signal and the second transmission line 44 for transmitting a second signal are connected in series with one end of the leads 45a and 45b, respectively, of the common mode choke coil 45. The first signal and second signal have mutually opposite phases. The other end of the leads 45a and 45b of the common mode choke coil 45 is connected in series with the third transmission line 46 and fourth transmission line 47, respectively. The third transmission line 46 transmits the first signal output from the common mode choke coil 45. The second transmission line 47 transmits the second signal output from the common mode choke coil 45. The differential receiver 49 of the semiconductor device 48 is connected in series with the third transmission line 46 and fourth transmission line 47. The first terminator 50 and second terminator 51 are connected in parallel with the third transmission line 46 and fourth transmission line 47, respectively.

Although FIG. 3 shows the differential transmission circuit 41 using only single terminators for the first terminator 50 and second terminator 51, respectively, a plurality of terminators may be used for the terminators. The differential receiver 49 for receiving signals is provided in the semiconductor device 48 in the differential transmission circuit 41, however, a differential driver for transmitting signals may also be provided. The electric potential connected to the other end of the lead 45c is not specifically limited, and may be a stable potential such as a ground.

The modes of eliminating noise included in the first signal and second signal in the differential transmission circuit 41 of FIG. 3 are described below. Noise elimination in the differential transmission circuit 41 of FIG. 3 is identical to that of the second embodiment. That is, the first and second signals from the first and second transmission lines 43 and 44 are input to the common mode choke coil 45. A counter electromotive force corresponding to the amount of noise carried in the input first and second signals is generated in the common mode choke coil 45, such that a noise eliminating capability is created. The majority of the noise of the first and second signals is eliminated by the common mode choke coil 45. The residual noise of the first and second signals which is not eliminated in the common mode choke coil 45 is output to the third transmission line 46 and fourth transmission line 47, passes through the first and second terminators 50 and 51, and flows to the lead 45c of the common mode choke coil 45. Then, the common mode choke coil 45 generates still further counter electromotive force relative to the noise flowing to the lead 45c. Therefore, the total counter electromotive force generated by the common mode choke coil 45 is increased by an amount equivalent to the noise passing through the lead 45c even when only the noise which has passed through the first and second transmission lines is input to the common mode choke coil 45. Accordingly, the signal noise eliminating capability of the common mode choke coil 45 is increased. Consequently, the common mode choke coil 45 eliminates the noise from the first and second signals.

In the present embodiment, the length of the third and fourth transmission lines 46 and 47 is longer than the length of the third and fourth transmission lines 6 and 7 of the first embodiment, similar to the second embodiment. Accordingly, the impedances of the third and fourth transmission lines 46 and 47 cannot be ignored, and the signals are affected. The resistance values of the first and second terminators 50 and 51 are adjusted so as to match the impedances of all transmission lines, including the third and fourth transmission lines 46 and 47. Consequently, the reflection phenomenon is prevented and distortion-free signal waveforms can be transmitted even when the third and fourth transmission lines 46 and 47 are long.

Therefore, the first and second signals from which noise has been eliminated and reflection has been prevented are input to the differential receiver 49.

The present embodiment provides the same effectiveness as the second embodiment. That is, when the length of the third and fourth transmission lines 46 and 47 is longer than the third and fourth transmission lines 6 and 7 of the first embodiment, the impedances of the third and fourth transmission lines 46 and 47 are matched by the first and second terminators 50 and 51. The noise eliminating capability is increased since the counter electromotive force generated in the common mode choke coil 45 is reinforced even when only the signals flowing through the first and second transmission lines 43 and 44 flow to the common mode choke coil 45. Therefore, the first and second signals from which the noise has been eliminated are input to the differential receiver 49, and malfunction of the differential receiver 49 is prevented and damage to the semiconductor device is also prevented. High quality signals with distortion-free signal waveforms can be stably transmitted.

In the present embodiment, a wire 52 on the other end of the first and second terminators 50 and 51 is connected to the lead 45c from the third and fourth transmission line side. The lead 45c is wound in the opposite direction relative to the leads 45a and 45b. Therefore, the wiring from the other end of the first and second terminators 50 and 51 to the common mode choke 45 is shorter than in the second embodiment. Thus, it is easier to design the printed circuit board of the differential transmission circuit of the present embodiment.

(4) Fourth Embodiment

Figure 4:
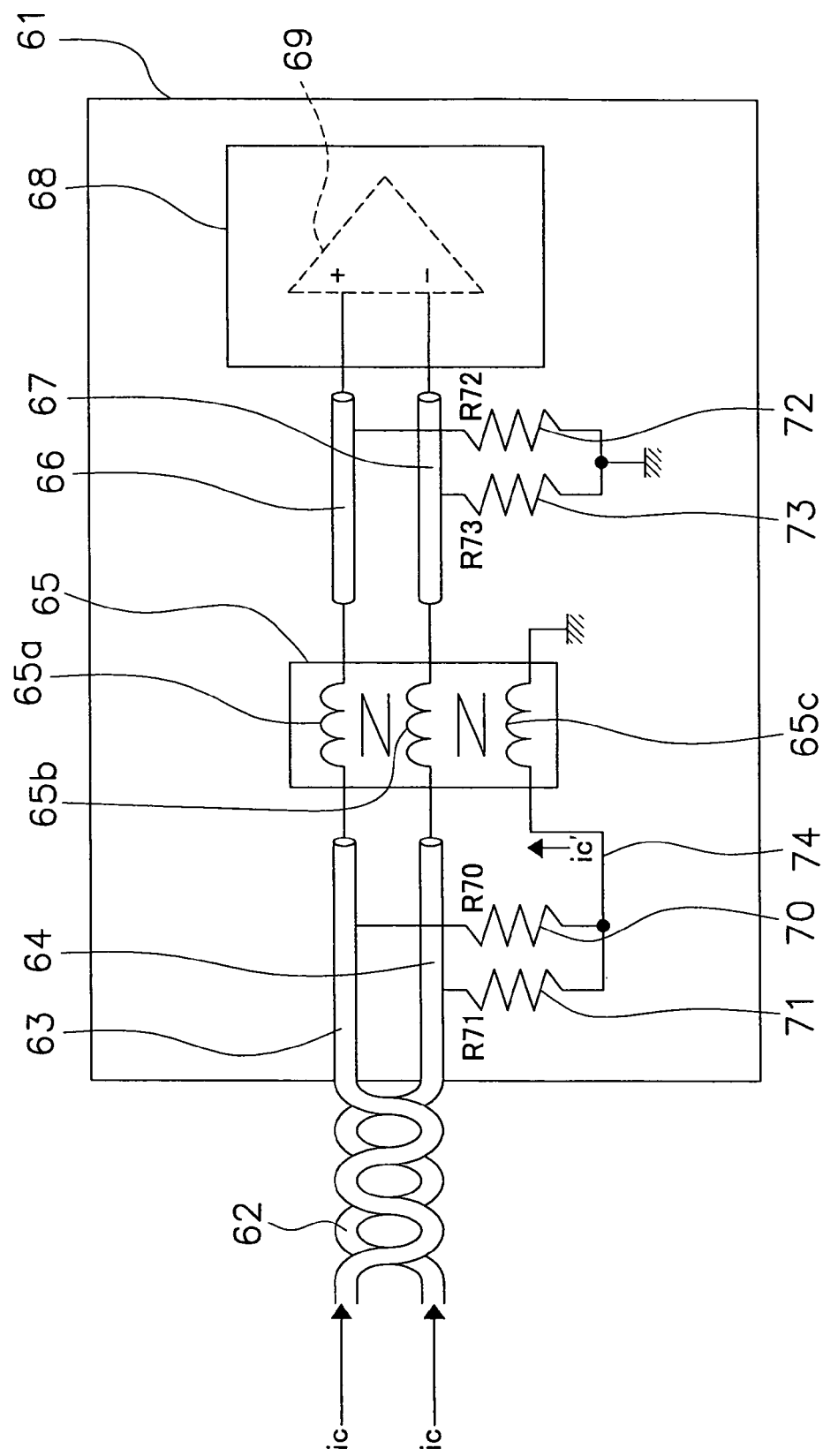
FIG. 4 is a diagram of a fourth embodiment of a differential transmission circuit.

FIG. 4 is a diagram of a differential transmission circuit of a fourth embodiment of the present invention. The differential transmission circuit 61 of the present embodiment is applicable to cases in which the quality of the differential signals transmitted through the transmission lines must maintain a higher signal quality than in the structure of the first embodiment. The differential transmission circuit 61 of FIG. 4 includes a third terminator 72 and fourth terminator 73. One end of the third terminator 72 is connected in parallel with the third transmission line 66, and one end of the fourth terminator 73 is connected in parallel with the fourth transmission line 67. The other end of the third and fourth terminators 72 and 73 is connected to a ground. In other respects the structure of the differential transmission circuit 61 is identical to that of the first embodiment. That is, the first transmission line 63 for transmitting a first signal and the second transmission line 64 for transmitting a second signal are connected in series with one end of a leads 65a and 65b, respectively, of the common mode choke coil 65. The other end of the leads 65a and 65b of the common mode choke coil 65 is connected in series with the third transmission line 66 and fourth transmission line 67, respectively. One end of a lead 65c of the common mode choke coil 65 is connected in parallel with one end of the first and second terminators 70 and 71, and the other end is connected to a ground. The leads 65a, 65b, and 65c are respectively wound in the same direction. The first and second signals have mutually reverse phases. The other end of the first terminator 70 and second terminator 71 is connected in parallel with the first transmission line 63 and second transmission line 64, respectively. The third transmission line 66 transmits the first signal output from the common mode choke coil 65. The fourth transmission line 67 transmits the second signal output from the common mode choke coil 65. A differential receiver 69 of the semiconductor device 68 is connected in series with the third transmission line 66 and fourth transmission line 67.

Although FIG. 4 shows the differential transmission circuit 61 using only single terminators for the first terminator 70, second terminator 71, third terminator 72 and fourth terminator 73 respectively, a plurality of terminators may be used for the terminators. The differential receiver 69 for receiving signals is provided in the semiconductor device 68 in the differential transmission circuit 61, however, a differential driver for transmitting signals may also be provided. The electric potential connected to the other end of the lead 65c is not specifically limited, and may be a stable potential such as a ground.

The modes of eliminating noise included in the first signal and second signal in the differential transmission circuit 61 of FIG. 4 are described below. In the following discussion, the amount of signal noise carried in a signal input to the transmission circuit from an external electronic device, that is, the total common mode current, is designated 100%.

The first and second signals from an external electronic device are first input to the first transmission line 63 and second transmission line 64, respectively, in the differential transmission circuit 61. The first signal reaches the branch point of the first transmission line 63 and the first terminator 70, and the second signal reaches the branch point of the second transmission line 64 and the second terminator 71. Then, part of the noise in the first signal flows to the first terminator 70. Part of the noise in the second signal flows to the second terminator 71. The present embodiment is applicable when there is excessive noise beyond that which can be eliminated by the structure of the first embodiment, and the noise of the first and second signals flowing to the first and second terminators 70 and 71 is, for example, 40% for each signal. Then, the residual noise remaining in the first signal and second signal is 60% for each signal. The 60% residual noise remaining in the first and second signals is respectively input to the common mode choke coil 65.

The 40% noise of the first and second signals flowing to the first terminator 70 and second terminator 71 passes through the first terminator 70 and second terminator 71 and is input to the common mode choke coil 65.

This time the noise and its input paths to the common mode choke coil 65 includes two sources of noise and two input paths in the present embodiment.

(a) The noise input directly from the first and second transmission lines 63 and 64 to the common mode choke coil 65 without flowing to the first and second terminators 70 and 71 is 60% of the noise.

(b) The noise of the first and second signals which flows through the first and second terminators 70 and 71 is 40% of the noise.

That is, 100% of the noise from path (a) and path (b) is input to the common mode choke coil 65. This means that 2.5-fold more counter electromotive force is generated compared to noise input only input from path (a).

In the present embodiment, when the noise of the first and second signals is excessive, the common mode choke coil 65 is increasingly unable to completely eliminate the noise of the first and second signals. The noise which cannot be eliminated from the first and second signals by the common mode choke coil 65 is 20% for each signal. The 20% of residual noise of the first and second signals is output to the third and fourth transmission lines 66 and 67. The first signal reaches the branch point of the third transmission line 66 and the third terminator 72, and the second signal reaches the branch point of the fourth transmission line 67 and the fourth terminator 73. Then, the residual 20% of the noise in the first and second signals flows through the third terminator 72 and fourth terminator 73, and enters the ground. That is, the residual 20% of the noise of the first and second signals is eliminated by the third and fourth terminators 72 and 73.

In the present embodiment, the length of the third and fourth transmission lines 66 and 67 is longer than the length of the third and fourth transmission lines 6 and 7 of the first embodiment. Accordingly, the impedances of the third and fourth transmission lines 66 and 67 cannot be ignored, and the signals are affected. The resistance values of the third and fourth terminators 72 and 73 are adjusted so as to match the impedances of all transmission lines, including the third and fourth transmission lines 66 and 67. Consequently, the reflection phenomenon is prevented and distortion-free signal waveforms can be transmitted even when the third and fourth transmission lines 66 and 67 are long.

Furthermore, the combined values of the first through fourth terminators match the impedances over all transmission lines. Consequently, the first and second signals are transmitted in a high definition state and the reflection phenomenon is prevented.

The first and second signals from which noise has been eliminated and reflection has been prevented are input to the differential receiver 69.

The structure of the present embodiment is ideally applicable to cases in which higher definition signal quality is maintained for the differential signals transmitted through the transmission lines in the structure of the first embodiment. That is, in the present embodiment, when the length of the third and fourth transmission lines 66 and 67 is longer than the third and fourth transmission lines 6 and 7 of the first embodiment, the impedances of the third and fourth transmission lines 66 and 67 are matched by the third and fourth terminators 72 and 73. The combined values of the first through fourth terminators 70, 71, 72, and 73 match the impedances of all the transmission lines. The present embodiment is effective even when the noise of the first and second signals has not been eliminated by the common mode choke coil 5 in the structure of the first embodiment. That is, since the noise eliminated by the first and second terminators 70 and 71 is input to the common mode choke coil 65, an electromotive force corresponding to the total noise originally carried in the first and second signals is generated in the common mode choke coil 65. The third and fourth terminators 72 and 73 effectively match the impedances of the third and fourth transmission lines 66 and 67, and eliminate noise. Therefore, the noise eliminating capability of the common mode choke coil 65 is increased, and the noise which cannot be eliminated by the common mode choke coil 65 is removed by the third and fourth terminators 72 and 73. Accordingly, even when the noise is so great that it cannot be eliminated by the first and second terminators alone, the noise can be reduced, and subsequently the first and second signal which have reduced noise levels can be input to the differential receiver 69. Therefore, malfunction of the differential receiver 69 and damage to the semiconductor device are prevented. High quality signals with distortion-free signal waveforms can be stably transmitted.

(5) Fifth Embodiment

Figure 5:
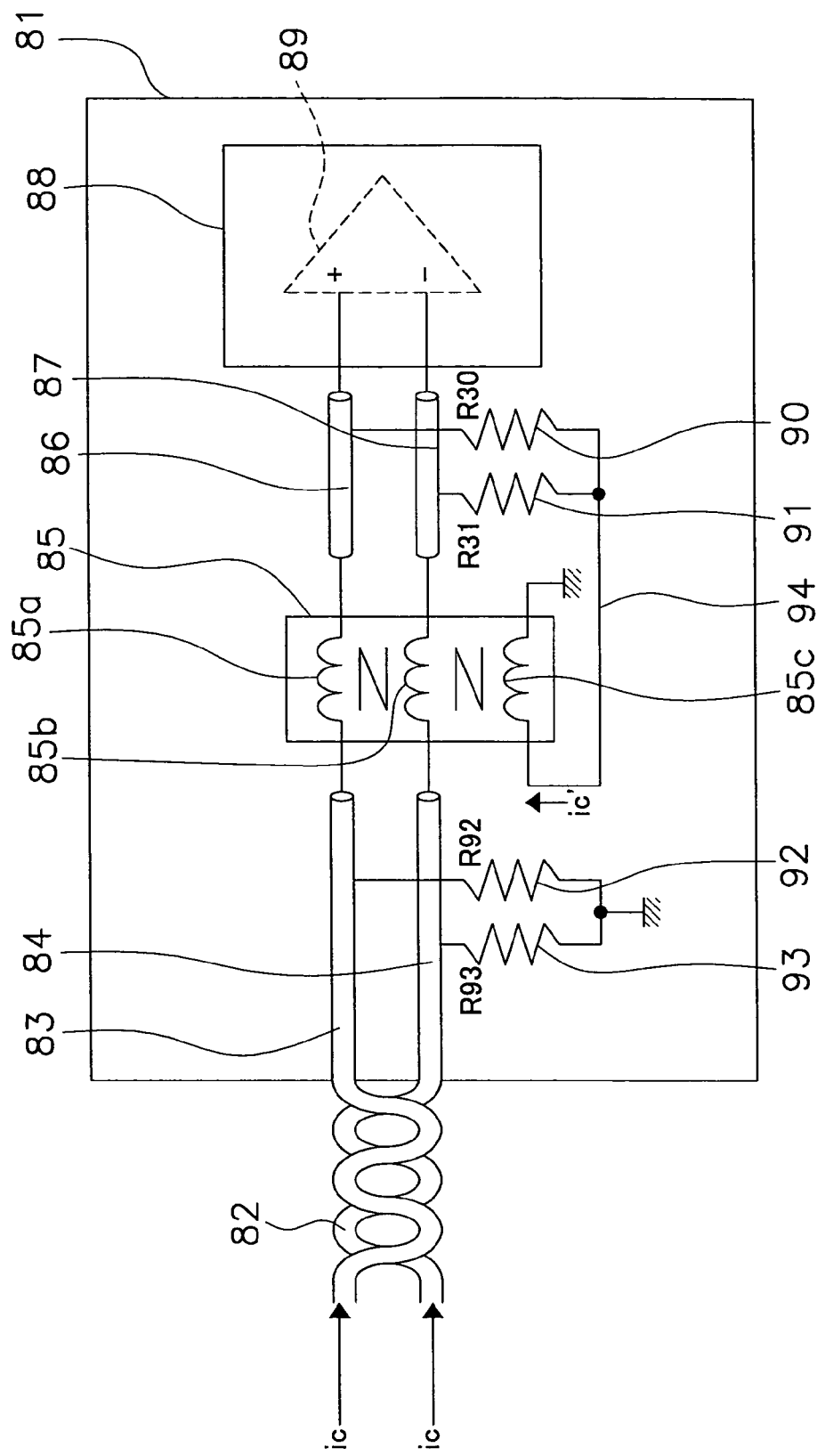
FIG. 5 is a diagram of a fifth embodiment of a differential transmission circuit.

FIG. 5 is a diagram of a differential transmission circuit of a fifth embodiment of the present invention. A differential transmission circuit 81 of this embodiment is ideally suited for cases of magnetic flux saturation in the common mode choke coil in the structure of the second embodiment. Similar to the second embodiment, the differential transmission circuit 81 is applicable to cases in which the length of the third and fourth transmission lines 83 and 84 are longer than the third and fourth transmission lines 6 and 7 of the first embodiment.

The differential transmission circuit 81 of FIG. 5 includes a third terminator 92 and fourth terminator 93. One end of the third terminator 92 is connected in parallel with the first transmission line 83, and one end of the fourth terminator 93 is connected in parallel with the fourth transmission line 84. The other end of the third and fourth terminators 92 and 93 are connected to a ground. In other respects the structure of the differential transmission circuit 81 is identical to that of the second embodiment. That is, the first transmission line 83 for transmitting a first signal and a second transmission line 84 for transmitting a second signal are connected in series with leads 85a and 85b, respectively, of the common mode choke coil 85. The first signal and second signal have mutually reverse phases. The other end of the leads 85a and 85b of the common mode choke coil 85 are connected in series with the third transmission line 86 and fourth transmission line 87, respectively, and one end of a lead 85c of the common mode choke coil 85 is connected in parallel with one end of the first and second terminators 90 and 91 from the signal output side, and the other end is connected to a ground. The leads 85a, 85b, and 85c are all wound in the same direction. The other end of the first terminator 90 and second terminator 91 is connected in parallel with the third transmission line 86 and fourth transmission line 87, respectively. The third transmission line 86 transmits the first signal output from the common mode choke coil 85. The fourth transmission line 87 transmits the second signal output from the common mode choke coil 85. A differential receiver 89 of the semiconductor device 88 is connected in series with the third transmission line 86 and fourth transmission line 87.

Although FIG. 5 shows the differential transmission circuit 81 using only single terminators for the first and second terminators 90 and 91 and third and fourth terminators 92 and 93, respectively, a plurality of terminators may be used for the terminators. The differential receiver 89 for receiving signals is provided in the semiconductor device 88 in the differential transmission circuit 81, however, a differential driver for transmitting signals may also be provided. The electric potential connected to the other end of the lead 85c is not specifically limited, and may be a stable potential such as a ground.

The modes of eliminating noise included in the first signal and second signal in the differential transmission circuit 81 of FIG. 5 are described below. Similar to the second embodiment, in the following discussion the amount of signal noise carried in a signal input to the transmission circuit from an external electronic device, that is, the total common mode current, is designated 100%.

The first and second signals from an external electronic device are first input to the first transmission line 83 and second transmission line 84, respectively, in the differential transmission circuit 81. The first and second signals reach the branch point of the first transmission line 83 and the third terminator 92, and the branch point of the second transmission line 84 and the fourth terminator 93, respectively. Then, the noise in the first signal flows through the third terminator 92 to the ground. The noise in the second signal flows through the fourth terminator 93 to the ground. The noise of the first and second signals flowing to the third and fourth terminators 92 and 93 is, for example, 60% for each signal, and the residual noise remaining in the first signal and second signal is 40% for each signal. The 40% residual noise remaining in the first and second signals is respectively input to the common mode choke coil 85. Magnetic flux saturation in the common mode choke coil 85 is prevented by the reduction of the amount of noise input to the common mode choke coil 85.

This item the common mode choke coil 85 generates a counter electromotive force corresponding to 40% of the noise carried by the input first and second signals. The first and second signals have 20% of the noise eliminated by the common mode choke coil 85. The first signal and second signal which contain the residual 20% of the noise are output from the common mode choke coil 85, and input to the third transmission line 86 and fourth transmission line 87, respectively.

The first signal reaches the branch point of the third transmission line 86 and the first terminator 90, and the second signal reaches the branch point of the fourth transmission line 87 and the second terminator 91. Then, the residual 20% noise of the first and second signals passes through the first and second terminators 90 and 91 and is input to the common mode choke coil 85.

This time, the noise and its input paths to the common mode choke coil 85 includes two sources of noise and two input paths.

(a) The noise input directly from the first and second transmission lines 83 and 84 without flowing to the third and fourth terminators 92 and 93 is 40% of the noise.

(b) The noise input through the first and second terminators 90 and 91 is 20% of the noise.

The common mode choke coil 85 receives 60% of the noise from path (a) and path (b). This means that approximately 1.5-fold more counter electromotive force is generated compared to noise input only input from path (a).

Since the noise eliminating capability of the common mode choke coil 85 is increased even with a loss of counter electromotive force, less noise is input to the differential receiver 89 than when the first and second terminators 90 and 91 are directly connected to a stable potential.

In the present embodiment, the length of the third and fourth transmission lines 86 and 87 is longer than the length of the third and fourth transmission lines 6 and 7 of the first embodiment. Accordingly, the impedances of the third and fourth transmission lines 86 and 87 cannot be ignored, and the signals are affected. The resistance values of the first and second terminators 90 and 91 are adjusted so as to match the impedances of all transmission lines, including the third and fourth transmission lines 86 and 87. Consequently, the reflection phenomenon is prevented and distortion-free signal waveforms can be transmitted even when the third and fourth transmission lines 86 and 87 are long. Furthermore, the combined values of the first through fourth terminators match the impedances over all transmission lines. Consequently, the first and second signals are transmitted in a high definition state.

The first and second signals from which noise has been eliminated and reflection phenomenon has been prevented are input to the differential receiver 89.

The differential transmission circuit 81 of the present embodiment is ideally suited to cases in which there is noise-induced magnetic flux saturation in the common mode choke coil in the structure of the second embodiment. The present embodiment is applicable for cases in which the length of the third and fourth transmission lines 86 and 87 is longer than the third and fourth transmission lines 6 and 7 of the first embodiment. The third and fourth terminators 92 and 93 eliminate the majority of the noise originally carried in the first and second signals, and prevent magnetic saturation of the common mode choke coil 85. The residual noise of the first and second signals which remains after passing through the common mode choke coil 85 flows through the first and second terminators 90 and 91 and is input to the common mode choke coil 85 to increase the noise eliminating capability of the common mode choke coil 85. The noise of the first and second signals is therefore eliminated. The first and second terminators 90 and 91 match the impedances of the third and fourth transmission lines 86 and 87, and the total value of the first through fourth terminators 90, 91, 92, and 93 match the impedances of all transmission lines. Therefore, malfunction of the differential receiver 89 and damage to the semiconductor device is prevented since the first and second signals having reduced noise are input to the differential receiver 89. High quality signals with distortion-free signal waveforms can be stably transmitted.

(6) Sixth Embodiment

The present invention is applicable even when using a shielded cable that has a first paired transmission line, which includes a first transmission line and a second transmission line, and is covered by a shield.

Figure 6:
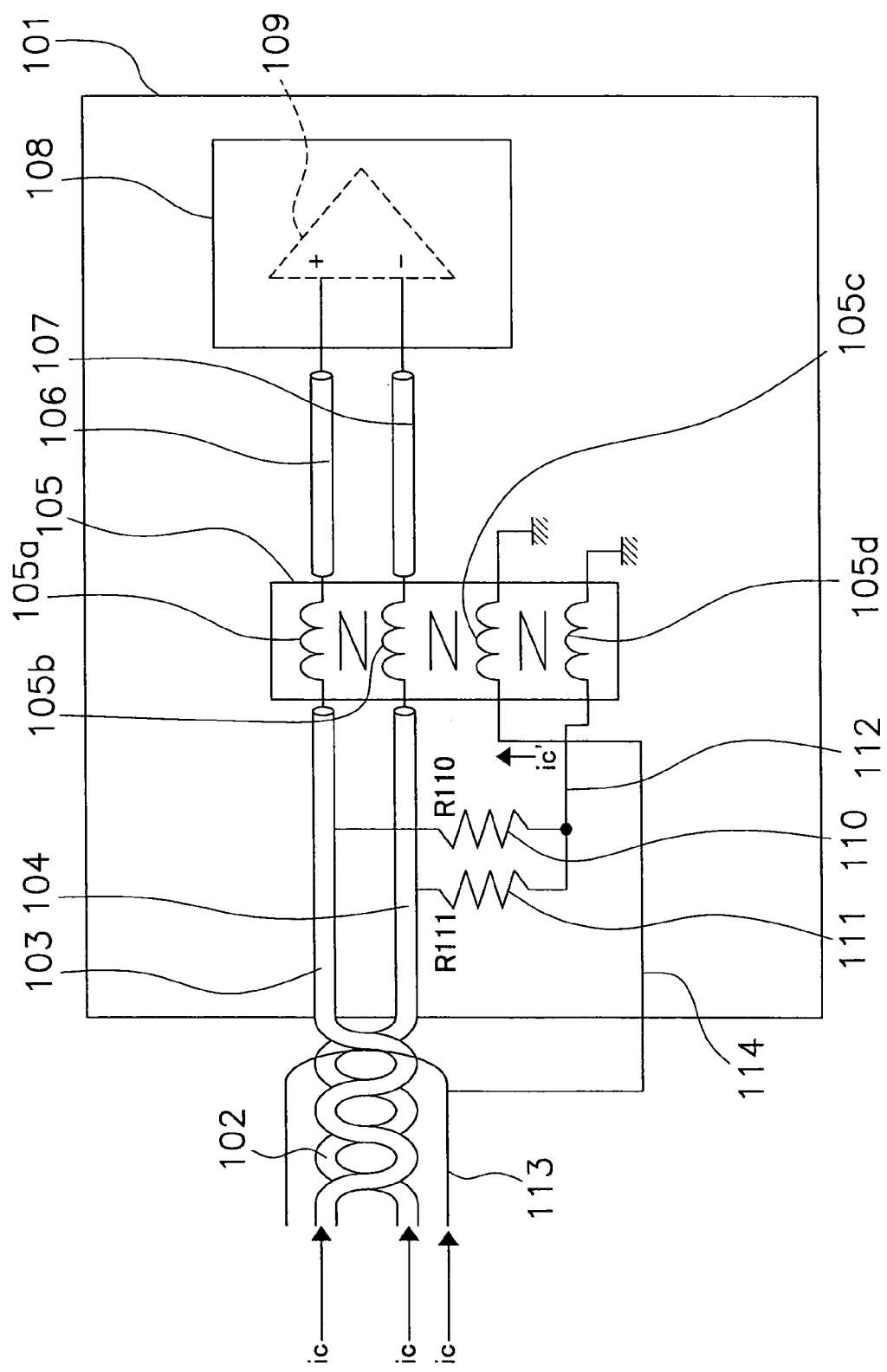
FIG. 6 is a diagram of a sixth embodiment of a differential transmission circuit.

FIG. 6 is a diagram of a differential transmission circuit of a sixth embodiment of the present invention. The differential transmission circuit 101 of the present embodiment has a first paired transmission line 102 which includes a first transmission line 103 and second transmission line 104, covered by a first shield 113. A wire 114 extending from the first shield 113 is connected to one end of a lead 105c of the common mode choke coil 105. The other end of the lead 105c is connected to a ground. Four leads 105a, 105b, 105c, and 105d of the common mode choke coil 105 are all wound in the same direction. In other respects the structure of the differential transmission circuit 101 is identical to that of the first embodiment. That is, the first transmission line 103 for transmitting a first signal and a second transmission line 104 for transmitting a second signal are connected in series with one end of the leads 105a and 105b, respectively, of the common mode choke coil 105. One end of a lead 105d is connected in parallel with the first and second terminators 110 and 111, and the other end is connected to a ground. The first and second signals have mutually reverse phases. The other end of the leads 105a and 105b of the common mode choke coil 105 is connected in series with the third transmission line 106 and fourth transmission line 107, respectively. The third transmission line 106 transmits the first signal output from the common mode choke coil 105. The fourth transmission line 107 transmits the second signal output from the common mode choke coil 105. A differential receiver 109 of a semiconductor device 108 is connected in series with the third transmission line 106 and fourth transmission line 107. The first terminator 110 and second terminator 111 are connected in parallel with the first transmission line 103 and second transmission line 104, respectively.

Although FIG. 6 shows the differential transmission circuit 101 using only single terminators for the first and second terminators 110 and 111, respectively, a plurality of terminators may be used for the terminators. The differential receiver 109 for receiving signals is provided in the semiconductor device 108 in the differential transmission circuit 101, however, a differential driver for transmitting signals may also be provided. The electric potential connected to the other end of the lead 105c is not specifically limited, and may be a stable potential such as a ground.

The modes of eliminating noise included in the first signal and second signal in the differential transmission circuit 101 of FIG. 6 are described below. Similar to the first embodiment of the present invention, in the following discussion the amount of signal noise carried in a signal input to the transmission circuit from an external electronic device, that is, the total common mode current, is designated 100%.

The first and second signals from an external electronic device first pass through the first paired transmission line 102 within the first shield 113, and are input to the first transmission line 103 and the second transmission line 104, respectively, within the differential transmission circuit 101. The first and second signals flow within the first transmission line 103 and second transmission line 104. The first signal reaches the branch point of the first transmission line 103 and the first terminator 110, and the second signal reaches the branch point of the second transmission line 104 and the second terminator 111. Then, the majority of the noise in the first signal flows to the first terminator 110. The majority of the noise in the second signal flows to the second terminator 111. In the present embodiment, the noise of the first and second signals flowing to the first and second terminators 110 and 111 is, for example, 80%. The 20% residual noise remaining in the first signal and second signal is input to the common mode choke coil 105. The 80% of the noise of the first and second signals passes through the first and second terminators 110 and 111, and is input to the common mode choke coil 105.

The noise of the first and second signals flowing through the first transmission line 102, and noise from electromagnetic interference and the like from external electronic devices is carried to the first shield 113. The noise carried by the first shield 113 is input to the common mode choke coil 105 through a lead 114.

This time, the noise and its input paths to the common mode choke coil 105 includes three sources of noise and three input paths.

(a) The noise input directly from the first and second transmission lines 103 and 104 to the common mode choke coil 105 without flowing through the first and second terminators 110 and 111 is 20% of the noise.

(b) The noise of the first and second signals input through the first and second terminators 110 and 111 is 80% of the noise.

(c) The noise input from the first shield 113 is 100%.

The noise of path (c) is, for example, 100%. According to the description above, the common mode choke coil 105 generates a counter electromotive force corresponding to the noise from path (c) in addition to path (a) and path (b). This means that approximately 2-fold or more counter electromotive force is generated compared to noise input only from paths (a) and (b).

Signals from which noise has been eliminated by the common mode choke coil 105 are input to the differential receiver 109. The common mode choke coil 105 generates a counter electromotive force corresponding to 200% or more of the noise regardless that only 20% of the noise carried in the first and second signals is input to the common mode choke coil 105. Accordingly, noise in the input first and second signals is eliminated by the common mode choke coil 105.

Consequently, the common mode choke coil 105 outputs a noise-free first signal to the third transmission line 106, and outputs a noise-free second signal to the fourth transmission line 107. Then, the noise-free first and second signals pass through the third and fourth transmission lines 106 and 107, respectively, and are input to the differential receiver 109.

Consider a case in which magnetic flux saturation occurs due to noise in excess of the tolerance limit being input to the common mode choke coil 105. Specifically, although the common mode choke coil 105 should generate a counter electromotive force corresponding to 200% of the input noise, only a counter electromotive force corresponding to 140% of the noise is generated due to magnetic flux saturation in the common mode choke coil 105. However, since 20% of the noise is to be eliminated by the common mode choke coil 105, there is a 120% surplus in the noise elimination capability of the common mode choke coil 105. Accordingly, the noise can be eliminated even when the common mode choke coil 105 is saturated.

The structure of the present embodiment is applicable when using a shielded cable that has a first paired transmission line, which includes a first transmission line 103 and a second transmission line 104, and is covered by a first shield 113. Specifically, the noise eliminated by the first and second terminators 110 and 111 is input to the common mode choke coil 105. The noise carried by the first shield 113 is also input to the common mode choke coil 105. Therefore, the common mode choke coil 105 generates a counter electromotive force corresponding to the noise input through the first shield and the noise originally carried in the first and second signals. Consequently, the noise eliminating capability of the common mode choke coil 105 is increased more than when the first shield is not used, and inputting noise exceeding the tolerance limit to the differential receiver 109 so as to cause malfunction of the differential receiver 109 is prevented.

Accordingly, the residual noise is eliminated from the first and second signals input to the differential receiver 109, so as to prevent malfunction of the differential receiver 109 and damage to the semiconductor device. Also prevented are the effects of signal noise from external electronic devices.

The differential transmission circuit 101 of the present embodiment may, as much as possible, shorten the length of the wiring between the common mode choke coil 105 and differential receiver 109, that is, the length of the third transmission line 106 and fourth transmission line 107. The influence of unmatched impedances generated by the stub wiring of the third transmission line 106 and fourth transmission line 107 can be ignored by shortening as far as possible the distance between the common mode choke coil 105 and differential receiver 109. Accordingly, there is scant signal reflection generated even when the impedances of the third and fourth transmission lines 106 and 107 are not matched, such that high quality signals with distortion-free signal waveforms can be stably transmitted.

Figure 7:
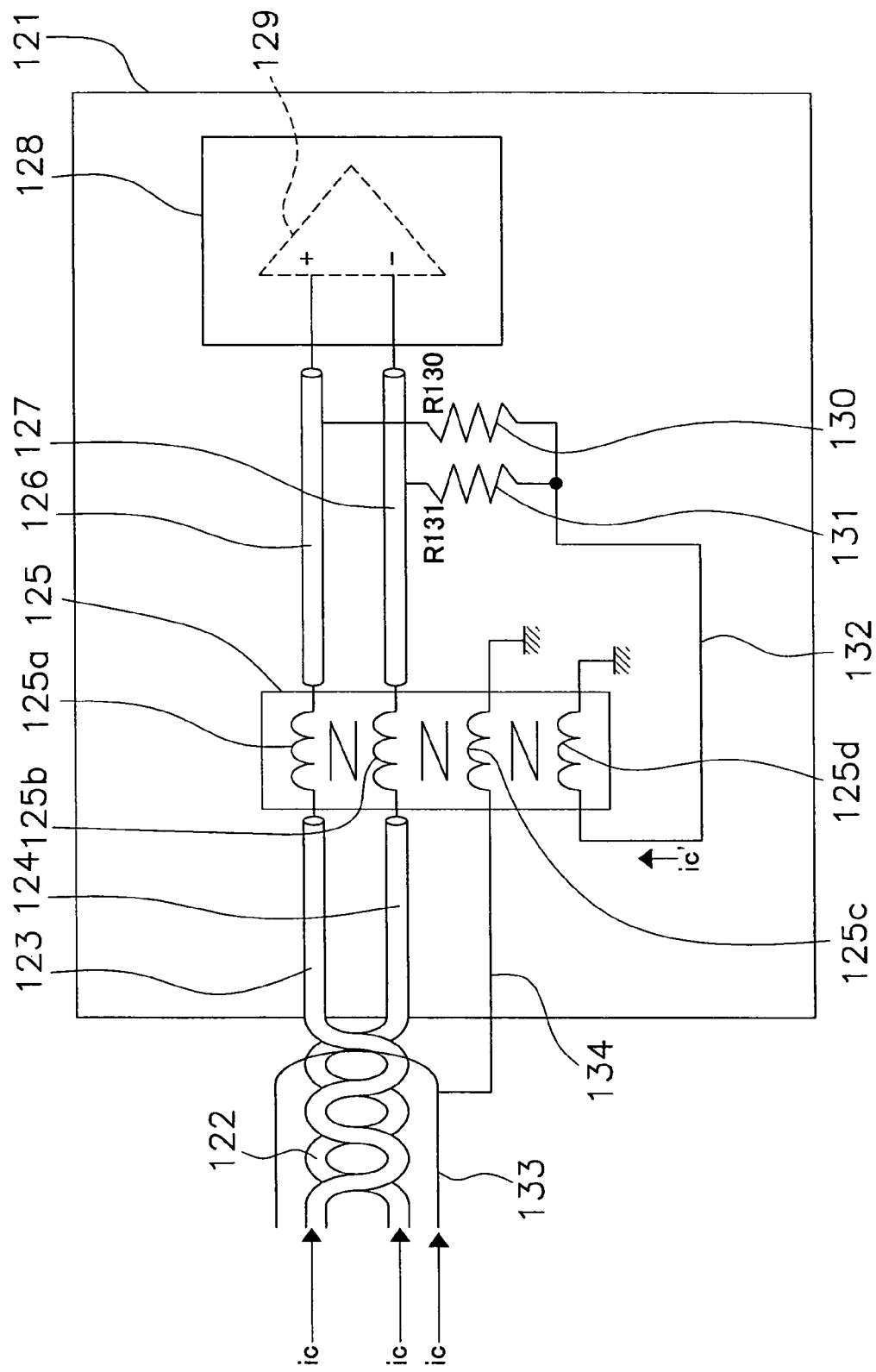
FIG. 7 is a diagram of a sixth embodiment of a differential transmission circuit.
Figure 8:
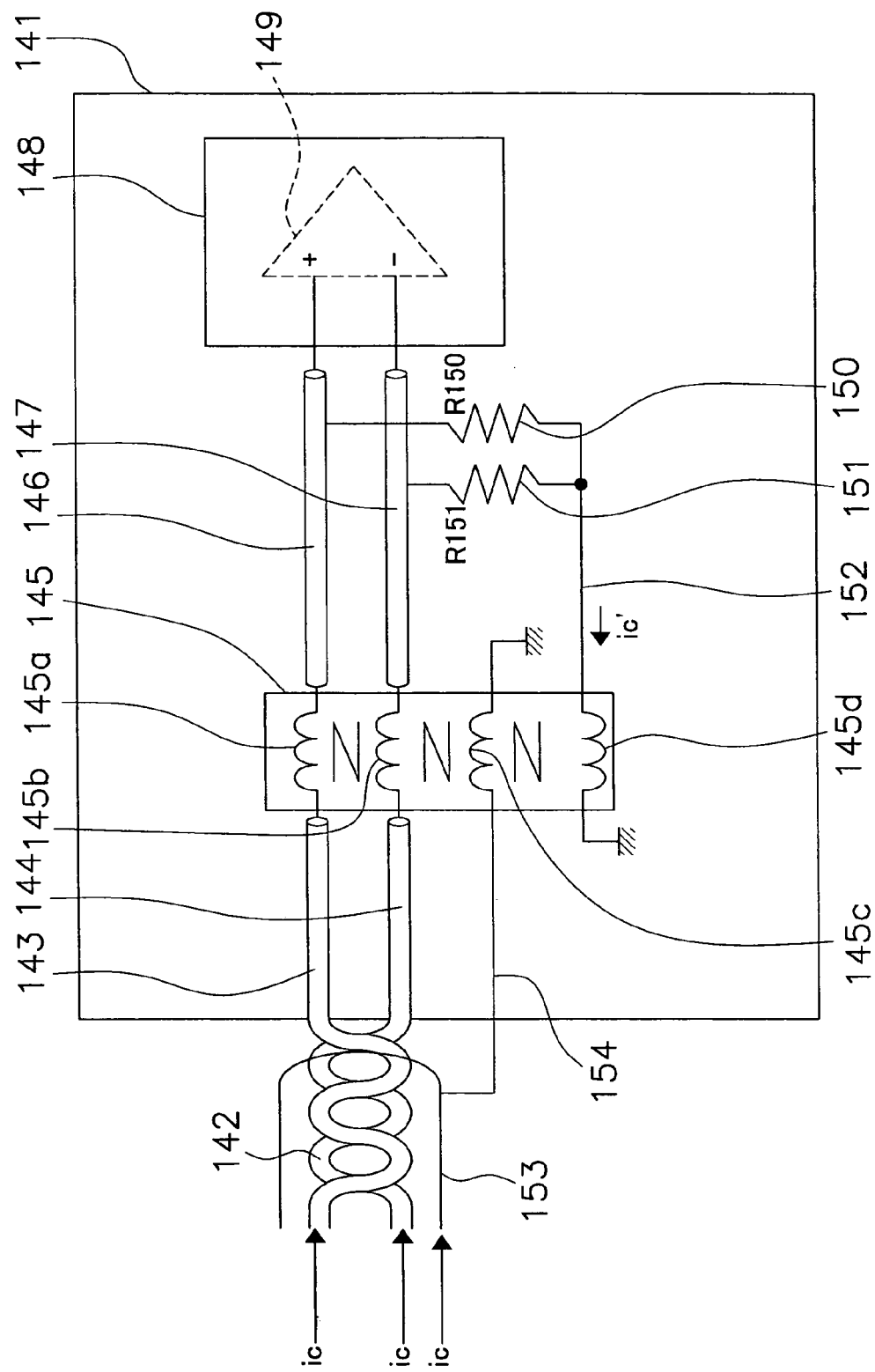
FIG. 8 is a diagram of a sixth embodiment of a differential transmission circuit.
Figure 9:
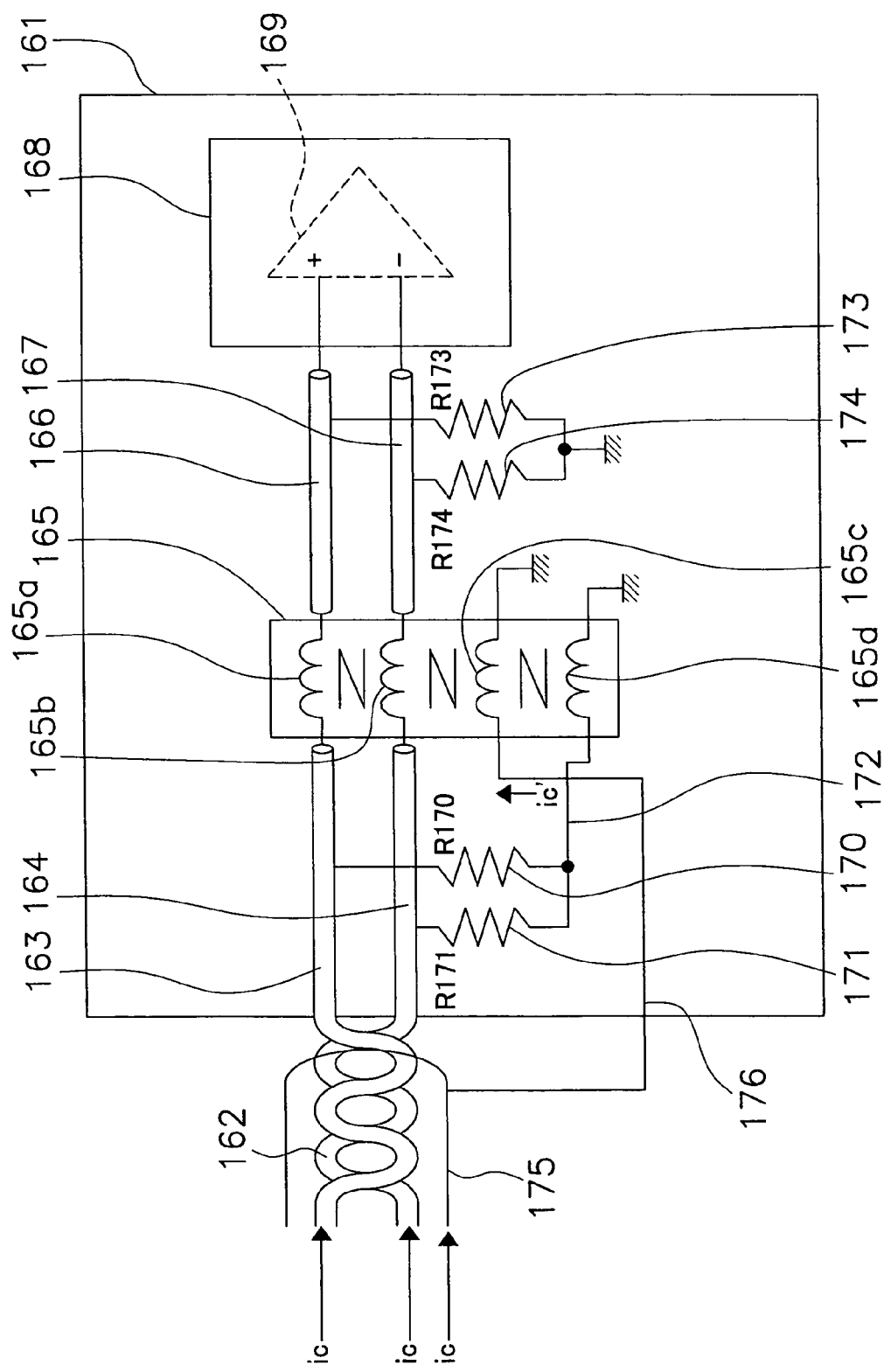
FIG. 9 is a diagram of a sixth embodiment of a differential transmission circuit.
Figure 10:
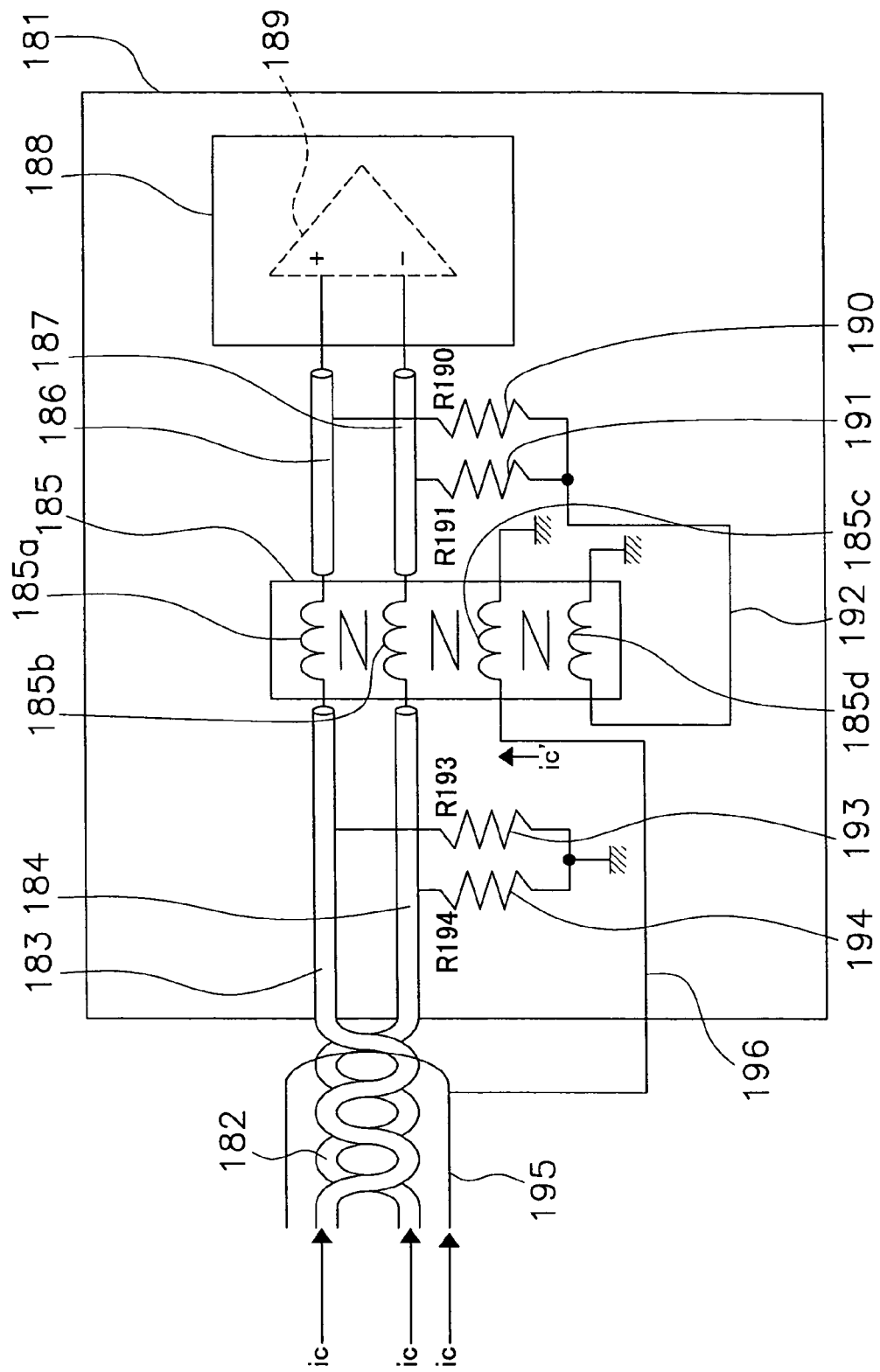
FIG. 10 is a diagram of a sixth embodiment of a differential transmission circuit.

Although the noise eliminating capability of the common mode choke coil of the present embodiment is increased using the first shield in the differential transmission circuit 1 of the first embodiment, the present invention is not limited to this arrangement. FIGS. 7 through 10 show differential transmission circuits using the first shield in the second through fifth embodiments. The differential transmission circuit 121 of FIG. 7 is applicable to cases in which the third and fourth transmission lines 126 and 127 are longer than in the present embodiment. Accordingly, high quality signals can be transmitted since not only is the noise of the first shield 113 used effectively, the impedances of the third and fourth transmission lines 126 and 127 are also matched. In the differential transmission circuit 141 of FIG. 8, the wiring of the first and second terminators 150 and 151 is connected to the common mode choke coil 145 from the third and fourth transmission lines 146 and 147 side. Consequently, the wire 152 can be shorter. The differential transmission circuit 161 of FIG. 9 is ideally suited for cases in which the length of the third and fourth transmission lines 166 and 167 is longer than the third and fourth transmission lines of the present embodiment, and cases in which the noise of the first and second signals is so excessive it cannot be reduced by the structure of the present embodiment. The differential transmission circuit 181 of FIG. 10 is effective when preventing magnetic flux saturation in the common mode choke coil is a priority, and when high definition transmission is desired without reflection of the transmission signal. Consequently, the structure using the first shield in the present embodiment is suitable in accordance with the capability of the common mode choke coil, the amount of noise to be eliminated, and the length of the third and fourth transmission lines.

(7) Seventh Embodiment

Figure 11:
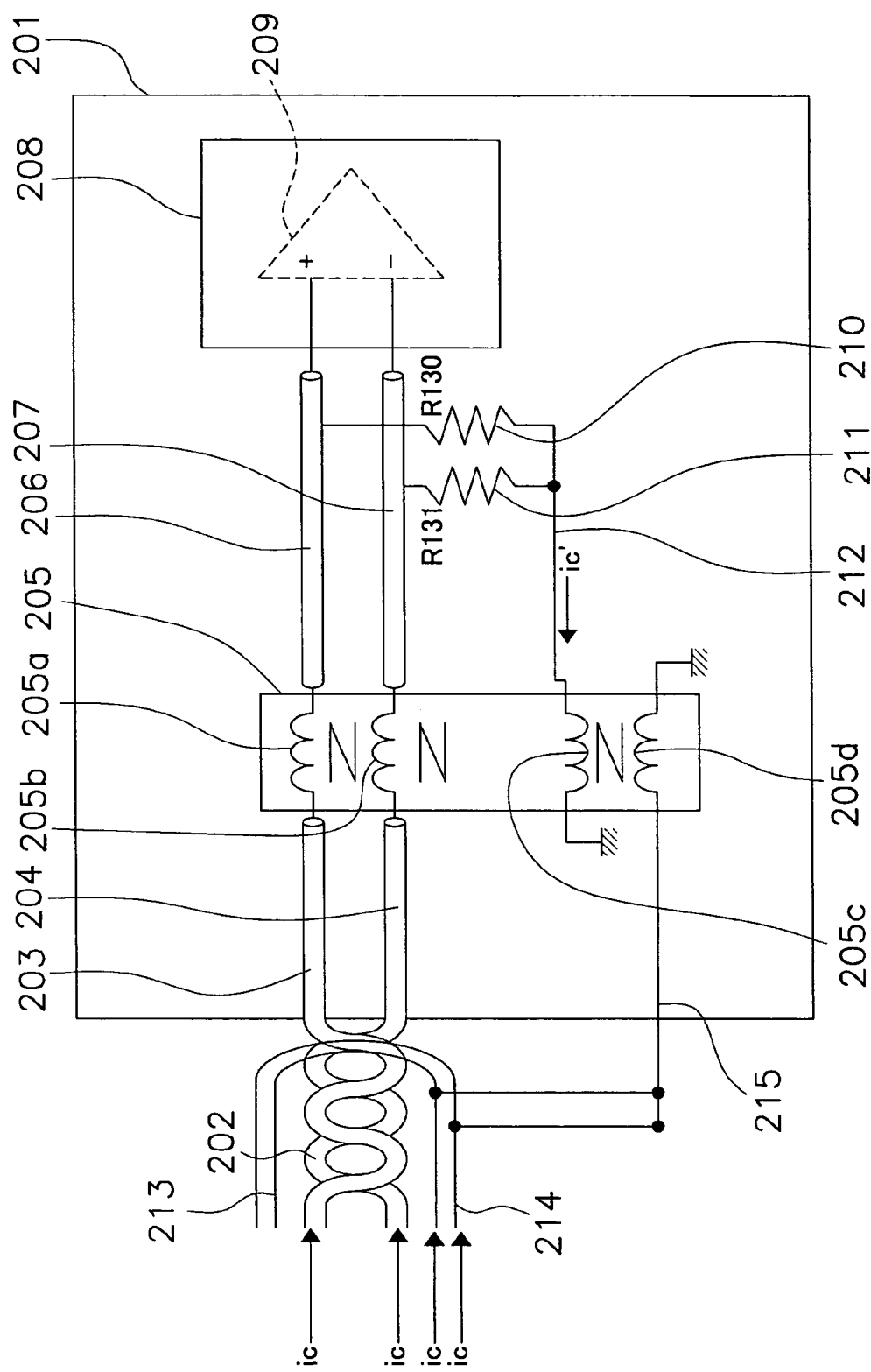
FIG. 11 is a diagram of a seventh embodiment of a differential transmission circuit.

FIG. 11 is a diagram of a differential transmission circuit of a seventh embodiment of the present invention. The differential transmission circuit 201 of the present embodiment has a paired transmission line 202 which includes a first transmission line 203 and second transmission line 204, covered by a first shield 213. This paired transmission line, which includes a plurality of paired transmission lines covered by the first shield 213, and is subsequently covered by a second shield 214.

Figure 12:
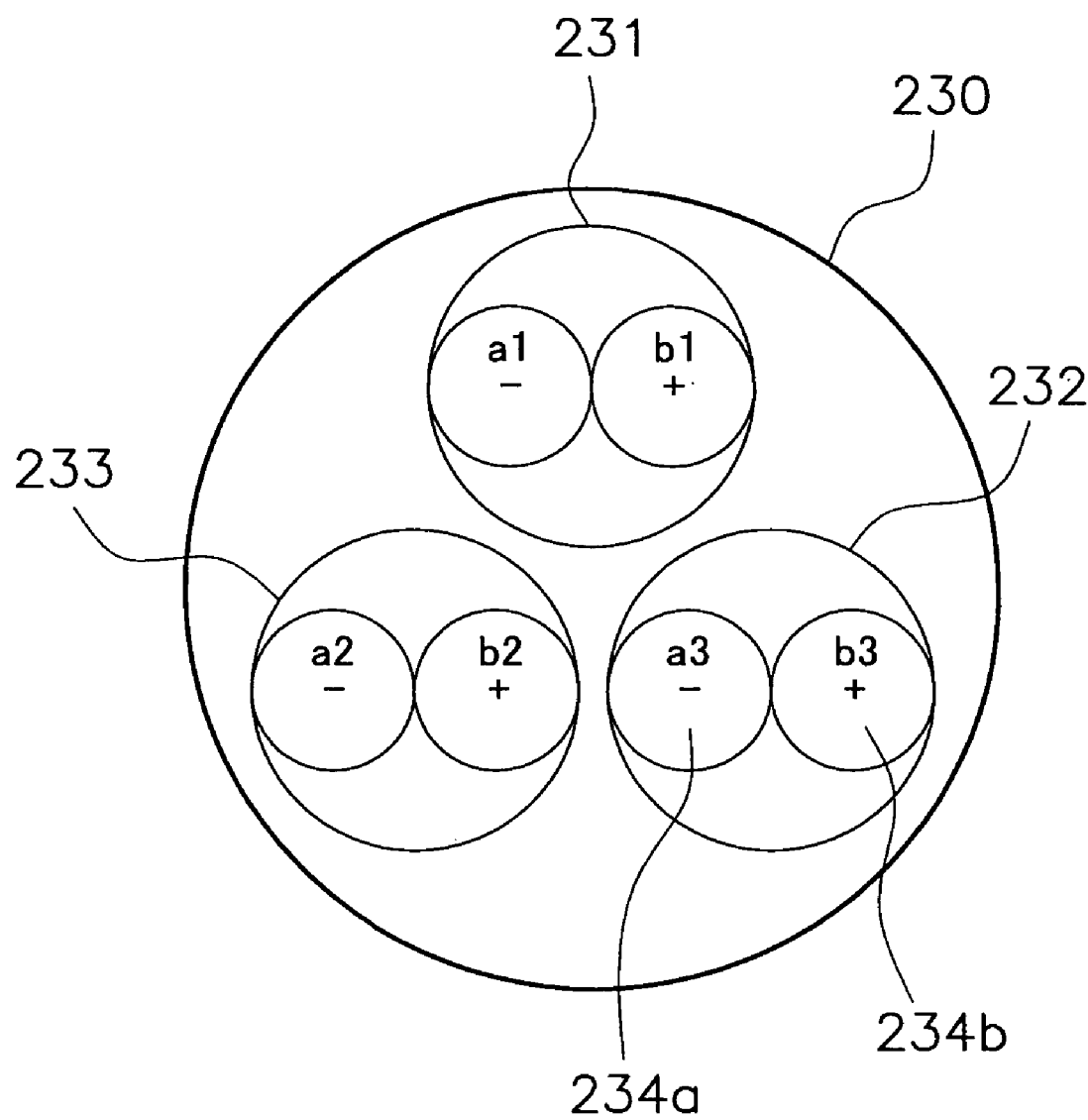
FIG. 12 is a diagram of an eighth embodiment of a differential transmission circuit.

FIG. 12 shows a cross section diagram of the cable in which a plurality of paired transmission lines are individually covered by a first shield, and the cable is subsequently covered by a second shield. The cable of FIG. 12 has first through third paired transmission lines. The respective paired transmission lines include positive and negative transmission lines to transmit signals having mutually reverse phases. The paired transmission lines are covered by first shields 231, 232, and 233. The three paired transmission lines covered by the first shields 231, 232, and 233 are further covered collectively by a second shield 230 so as to form one cable.

To simplify the following description, FIG. 11 shows a single first paired transmission line among the plurality of paired transmission lines of FIG. 12. In the differential transmission circuit 201 of FIG. 11, a wire 215 extending from the first shield 213 and second shield 214 is connected to one end of a lead 205d of the common mode choke coil 205. The other end of the lead 205d is connected to a ground. In other respects the structure of the differential transmission circuit 205 is identical to that of the second embodiment. That is, a first transmission line 203 for transmitting a first signal and a second transmission line 204 for transmitting a second signal are connected in series with one end of leads 205a and 205b, respectively, of the common mode choke coil 205. The first signal and second signal have mutually reverse phases. The other end of the leads 205a and 205b of the common mode choke coil 205 is connected in series with the third transmission line 206 and fourth transmission line 207, respectively. One end of the lead 205c is connected in parallel with the first and second transmission lines 210 and 211, respectively, from the third and fourth transmission lines 206 and 207 side, and the other end is connected to a ground. The lead 205c is wound in a mutually opposite direction relative to the leads 205a, 205b, and 205d. The third transmission line 206 transmits the first signal output from the common mode choke coil 205. The fourth transmission line 207 transmits the second signal output from the common mode choke coil 205. The differential receiver 209 of the semiconductor device 208 is connected in series with the third transmission line 206 and fourth transmission line 207. The first terminator 210 and second terminator 211 are connected in parallel with the third transmission line 206 and fourth transmission line 207, respectively.

Although FIG. 11 shows the differential transmission circuit 201 using only single terminators for the first and second terminators 210 and 211, respectively, a plurality of terminators may be used for the terminators. The differential receiver 209 for receiving signals is provided in the semiconductor device 208 in the differential transmission circuit 201, however, a differential driver for transmitting signals may also be provided. The electric potential connected to the other end of the leads 205c and 205d is not specifically limited, and may be a stable potential such as a ground.

The modes of eliminating noise included in the first signal and second signal in the differential transmission circuit 201 of FIG. 11 are described below. Similar to the first embodiment of the present invention, in the following discussion the amount of signal noise carried in a signal input to the transmission circuit from an external electronic device, that is, the total common mode current, is designated 100%.

The first and second signals from an external electronic device first pass through the first paired transmission line 202 within the first shield 213, and are input to the first transmission line 203 and the second transmission line 204, respectively, within the differential transmission circuit 201. The first and second signals flow within the first transmission line 203 and second transmission line 204, and are input to the common mode choke coil 205. Then, a counter electromotive force corresponding to 100% of the noise carried in the input first and second signals is generated in the common mode choke coil 205, so as to generate a noise eliminating capability. The common mode choke coil 205 eliminates 80% of the noise carried in the first and second signals. The first and second signals containing the residual 20% of the noise are output from the common mode choke coil 205, and are input to the third transmission line 206 and fourth transmission line 207, respectively.

The first signal reaches the branch point of the third transmission line 206 and the first terminator 210, and the second signal reaches the branch point of the fourth transmission line 207 and the second terminator 211. Then, the 20% residual noise in the first signal flows to the first terminator 210, and is input to the common mode choke coil 205.

Noise in first and second signals flowing through the first paired transmission line 202 is carried to the first shield 213. Noise caused by electromagnetic interference from external electronic devices is carried to the second shield 214. Noise carried by the first shield 213 and the second shield 214 passes through the wire 215 and is input to the common mode choke coil 205.

This time, the noise and its input paths to the common mode choke coil 205 includes four sources of noise and four input paths.

(a) The noise input directly from the first and second transmission lines 203 and 204 is 100% of the noise.

(b) The noise input through the first and second terminators 210 and 211 is 20% of the noise.

(c) The noise input from the first shield 213 is 100%.

(d) The noise input from the second shield 214 is 100%.

The noise of path (c) and path (d) is, for example, 100%. According to the description above, the common mode choke coil 205 generates a counter electromotive force corresponding to the noise from path (d) in addition to path (a), path (b), and path (c). That is, the common mode choke coil 205 receives 320% of the noise from the paths (a) through (d). This means that approximately 1.4-fold or more counter electromotive force is generated compared to noise input only from paths (a), (b), and (c).

Since the noise eliminating capability of the common mode choke coil 205 is increased even if there is a loss of counter electromotive force, less noise is input to the differential receiver 209 compared to when there is no second shield 214.

The present embodiment is effective in cases in which the length of the third and fourth transmission lines 206 and 207 is so long it cannot be ignored. Specifically, in the present embodiment, the length of the third and fourth transmission lines 206 and 207 are longer than the third and fourth transmission lines of the first and sixth embodiments. The first terminator 210 is adjusted so as to match the impedances of the entire transmission path, including the third transmission path 206. The second terminator 211 is adjusted so as to match the impedance of the entire transmission path, including the fourth transmission path 207. Therefore, the differential signal reflection phenomenon is prevented and distortion-free signal waveforms can be transmitted even when the third and fourth transmission paths 206 and 207 are long.

Consequently, first and second signals from which noise has been eliminated and the reflection phenomenon has been prevented are input to the differential receiver 209.

Figure 13:
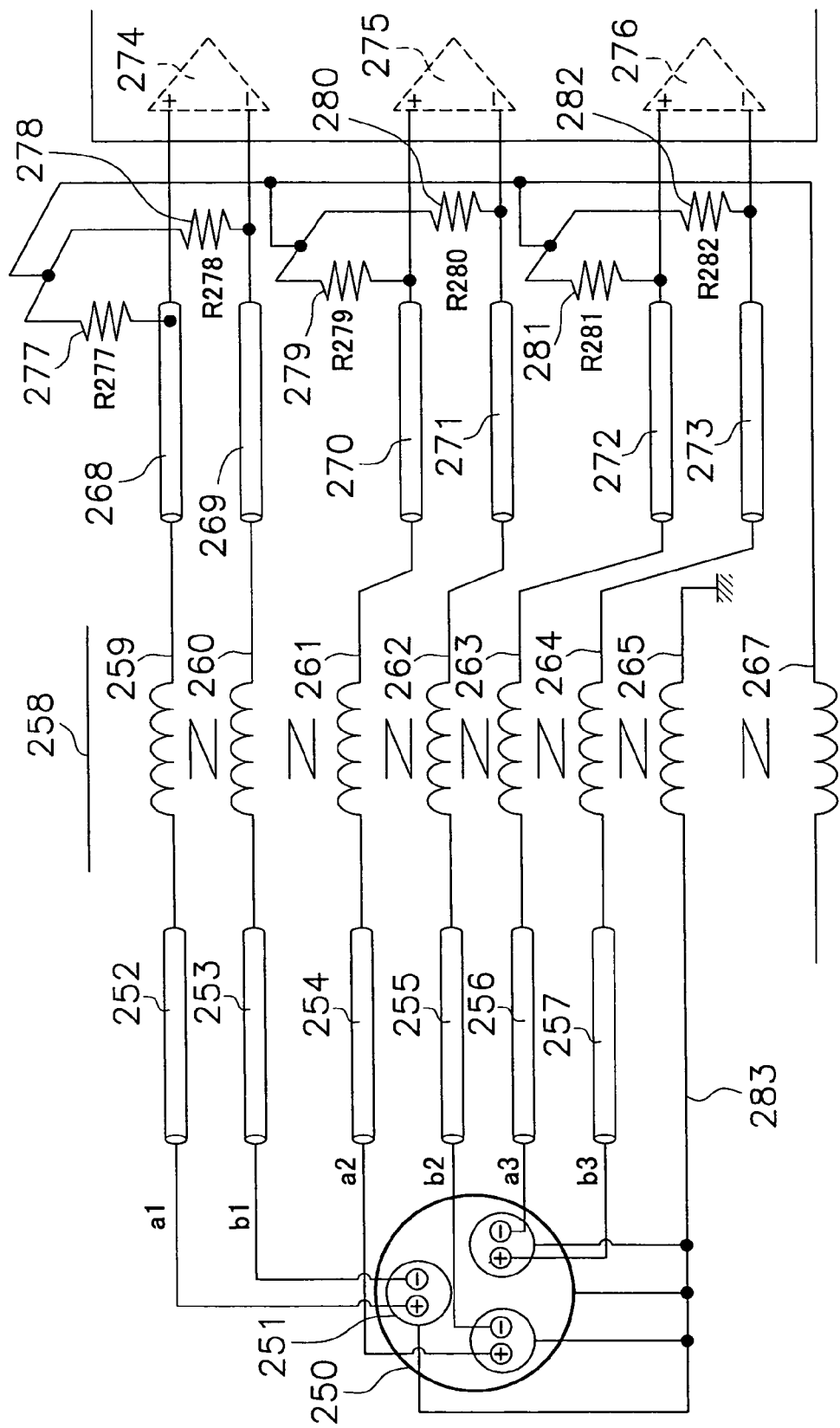
FIG. 13 is a detailed wiring diagram of the differential transmission circuit and cable of FIG. 12.

The wiring of the cable and differential transmission circuit 201 when a plurality of paired transmission lines are used is described below. FIG. 13 is a wiring diagram using the cable having the cross section shown in FIG. 12 in the differential transmission circuit 201 of FIG. 11. The differential transmission circuit of FIG. 13 has the differential transmission circuit 201 of FIG. 11 connected to the paired transmission lines. Accordingly, the structure of individual differential transmission circuits is identical to FIG. 11.

A first paired transmission line has a first transmission line a1 for transmitting a positive signal, and a second transmission line b1 for transmitting a negative signal, and transmits first and second signals having mutually reverse phases. A second paired transmission line has a fifth transmission line a2 for transmitting a positive signal, and a sixth transmission line b2 for transmitting a negative signal, and transmits third and fourth signals having mutually reverse phases. A third paired transmission line has a ninth transmission line a3 for transmitting a positive signal, and a tenth transmission line b3 for transmitting a negative signal, and transmits fifth and sixth signals having mutually reverse phases. The first through third paired transmission lines are respectively covered by a first shield, and the plurality of first shields 251 are further covered by a second shield 250. The respective first shields and second shield are connected to the common mode choke coil 258 through a wire 283. In other respects the structure of each transmission line and the common mode choke coil is identical to the structure of FIG. 11 previously described in section (7-1), and further description is therefore omitted.

Although there are three paired transmission lines in FIG. 13, more than three paired transmission lines are also possible. In the case of more than three paired transmission lines, it is desirable that the connections are identical to FIG. 13.

The third signal and fifth signal may be identical to the first signal, or may be different signals. The fourth signal and sixth signal may be identical to the second signal, or may be different signals.

The structure of the present embodiment is applicable to cables which include a plurality of paired transmission lines covered by a second shield 214. Specifically, the noise carried by the first shield 213 is input to the common mode choke coil 205. The noise carried by the second shield 214 is also input to the common mode choke coil 205. Therefore, the common mode choke coil 205 generates a counter electromotive force which corresponds to the total noise input through the first and second shields 213 and 214 and the noise originally carried by the transmission signals. Consequently, the noise eliminating capability of the common mode choke coil 205 is increased, and noise exceeding the tolerance limit of differential receivers 209 is prevented from being input to differential receivers 209 so as to prevent malfunction of differential receivers 209.

Since the terminators match the impedances of all transmission lines, high quality signal with distortion-free waveforms can be stably transmitted.

Accordingly, malfunction of the differential receiver and damage to the semiconductor device can be prevented. The effects of signal noise from external electronic devices can also be prevented.

Although the present embodiment uses a second shield 214 in the differential transmission circuit 141 of the third embodiment (FIG. 8), the present invention is not limited to this arrangement. The present embodiment may also use a cable which includes a second shield identical to those shown in the differential transmission circuits of the first and second embodiments (FIGS. 6 and 7), and the fourth through sixth embodiments (FIGS. 9 and 10).

Other Differential Transmission Circuit Examples

Figure 14:
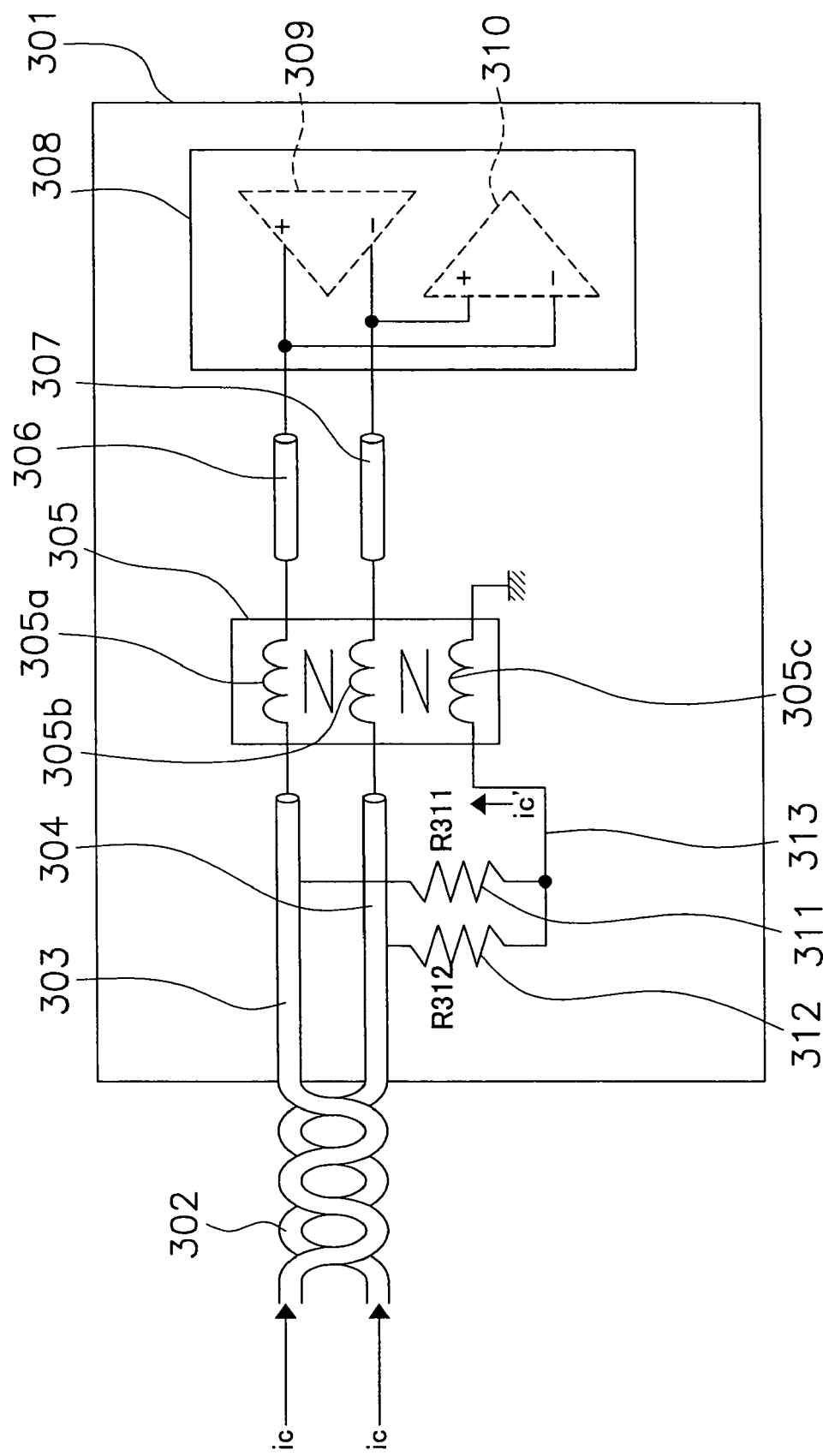
FIG. 14 is a first example of another differential transmission circuit.

Practical applications of the differential transmission circuit of the present invention are described below. FIG. 14 shows a first such practical application of the differential transmission circuit of the present invention. In the differential transmission circuit 301 of FIG. 14, the semiconductor device 208 has a differential receiver 309 and a differential driver 310. That is, the differential transmission circuit 301 is a differential transceiver capable of transmitting and receiving signals. Therefore, the semiconductor device is not limited to a differential receiver, and may also be a differential driver.

Figure 15:
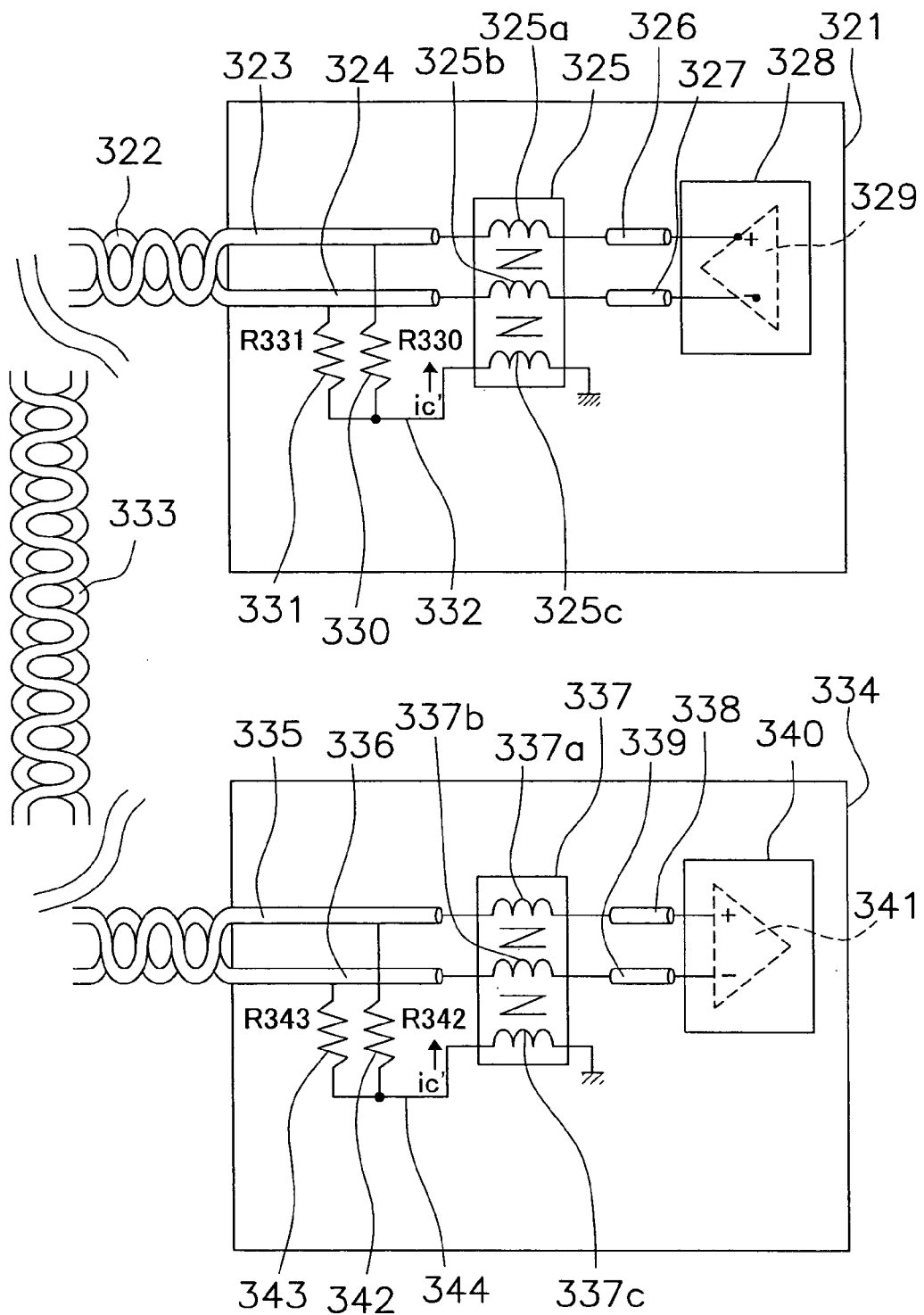
FIG. 15 is a second example of another differential transmission circuit.

FIG. 15 is a second example of a practical application of the differential transmission circuit of the present invention. FIG. 15 is an example of a differential transmission system. The differential transmission system of FIG. 15 has two differential transmission circuits 321 and 334 connected by a cable which has paired transmission lines. Among the two differential transmission circuits 321 and 334, the differential transmission circuit 321 is a differential signal transmission circuit which includes a differential driver in a semiconductor device 328. The differential transmission circuit 334 is a differential signal reception circuit which includes a differential receiver 341 in a semiconductor device 340. Since the differential transmission system of this structure is highly noise resistant, high quality signals can be transmitted between the differential signal transmission circuit 321 and the differential signal reception circuit 334.

Although not shown in the drawings, a surge protector may also be connected in parallel with the first through fourth transmission lines in the first through seventh embodiments and other examples of differential transmission circuits. A lowpass filter may also be connected in series with the first through fourth transmission lines. Consequently, noise can be even more effectively eliminated.

The differential transmission circuit of the present invention is also applicable to audio-video transceivers, such as AV devices installed in automobiles, since electromagnetic interference from other devices can be prevented without shielding the transmission circuits. Specifically, audio-video transceivers installed in vehicles are connected to an external output device. The audio-video transceiver includes the differential transmission circuit of the present invention and a control means. The differential transmission circuit transmits signals, and the control means outputs the signals transmitted by the differential transmission circuit to an external output device. Since an audio-video transceiver having this structure can eliminate noise even when affected by electromagnetic interference from other devices, such as, for example, the engine and the like, video and audio having excellent image quality and sound quality can be transmitted and received. Furthermore, since electromagnetic interference from other devices is prevented, safe operation is ensured since the engine and brake system of the automobile are not adversely affected. The automobile can also be lighter in weight by using the unshielded differential transmission circuit.

Common Mode Choke Coil

The common mode choke coil of the present invention is described in detail below with reference to FIGS. 16 through 22.

(8) Eighth Embodiment

Figure 16:
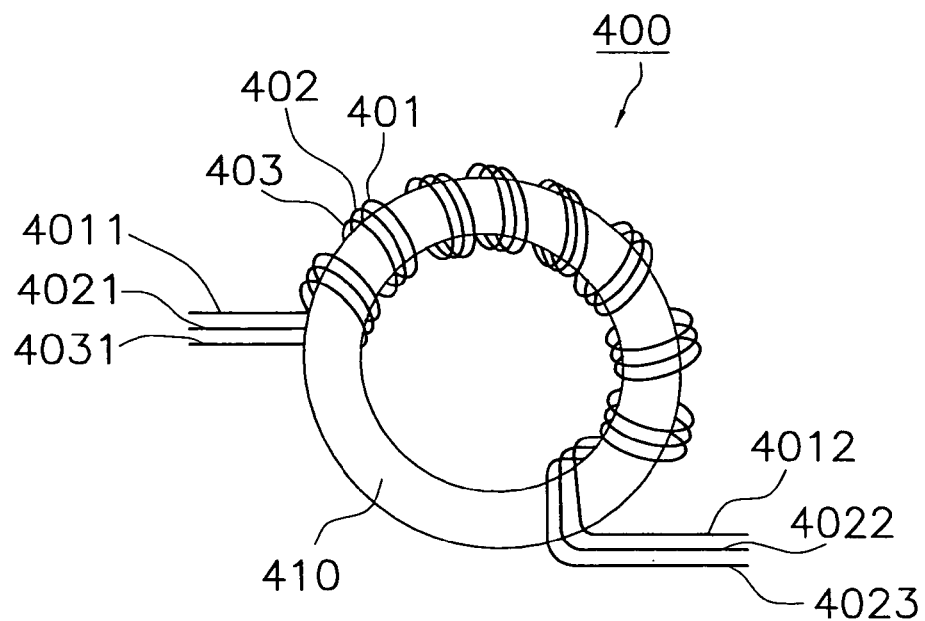
FIG. 16 shows the common mode choke coil of the eighth embodiment.

FIG. 16 illustrates the common mode choke coil of an eighth embodiment of the present invention. The common mode choke coil 400 of FIG. 16 may be used in the differential transmission circuits of the first, second, fourth, and fifth embodiments (FIGS. 1, 2, 4, and 5).

The common mode choke coil 400 of FIG. 16 includes a magnetic body 410, and three leads 401, 402, 403. The three leads 401, 402, 403 are all wound in the same direction on the magnetic body 410.

Figure 17:
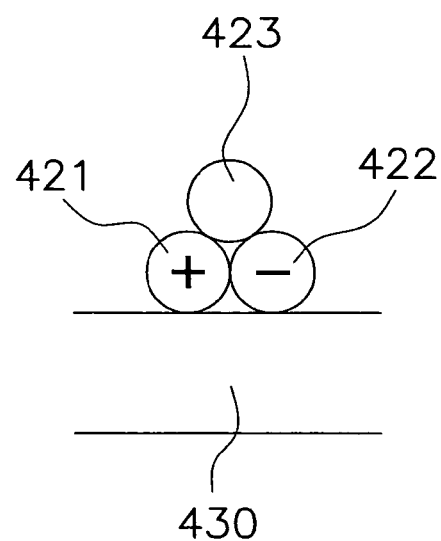
FIG. 17 is a cross section view of the common mode choke coil of FIG. 16.

FIG. 17 is a cross section view of the common mode choke coil 400 of FIG. 16. FIG. 17 is a vertical cross section view of the common mode choke coil 400 of FIG. 16 relative to the winding direction of the leads 401, 402, 403. As shown in FIG. 17, the common mode choke coil 400 has a first layer formed by alternatingly winding a positive lead 421 and a negative lead 422 on the surface of a magnetic body 430. A second layer is formed on the first layer by winding a lead 423 so as to be positioned medially to the positive lead and negative lead. The second layer is formed such that the center of the lead 423 is everywhere equidistant from the centers of the leads 421 and 422 of the first layer in contact with the lead 423 of the second layer.

A positive lead 421 is connected to a first transmission line, and a negative lead is connected to a second transmission line. The positive lead 421 and the negative lead 422 transmit signals having mutually reverse phases. That is, the positive lead 421 transmits a normal phase signal, and the negative lead 422 transmits a reverse phase signal. The lead 423 is connected to a stable electric potential, such as a ground.

The common mode choke coil having this structure provides that the distance from the leads 421 and 422 which transmit signals having mutually reverse phases to the lead 423 connected to a stable electric potential is everywhere equidistant. Therefore, the impedances of each lead are equal and stable relative to the stable potential. Accordingly, signals can be transmitted while maintaining excellent signal quality. Since the matching of the characteristic impedances is extremely stable, this structure is also applicable to transmission of high frequency signals.

(9) Ninth Embodiment

Figure 18:
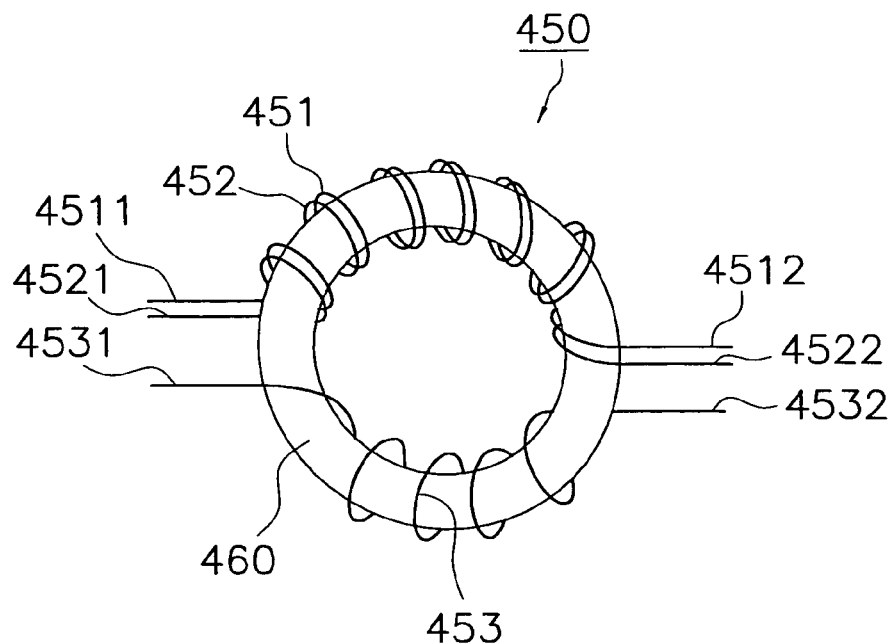
FIG. 18 shows the common mode choke coil of the ninth embodiment.

FIG. 18 illustrates a common mode choke coil of a ninth embodiment of the present invention. The common mode choke coil 450 of FIG. 18 may be used in the differential transmission circuit 41 of the third embodiment (FIG. 3).

The common mode choke coil 450 of FIG. 18 includes a magnetic body 460, and three leads 451, 452, 453. Among the three leads 451, 452, 453, the two leads 451 and 452 are wound in the same direction on the magnetic body 460. The remaining lead 453 is wound on the magnetic body 460 in the opposite direction relative to the winding direction of the leads 451 and 452.

When the common mode choke coil 450 of the present embodiment is used in the differential transmission circuit 41 of the third embodiment, the leads 45a and 45b of the common mode choke coil 45 of the differential transmission circuit 41 correspond to the leads 451 and 452 of the common mode choke coil 450 of FIG. 18. The lead 45c of the common mode choke coil 45 of the differential transmission circuit 41 of FIG. 3 corresponds to the lead 453 of the common mode choke coil 450 of FIG. 18.

When this common mode choke coil 450 is used in a differential transmission circuit, the connection of the leads within the differential transmission circuit and the leads of the common mode choke coil 450 are determined based on the flow direction of the common mode current flowing to each lead of the common mode choke coil 450. That is, in the differential transmission circuit 41 of FIG. 3, the leads 451 and 452 of FIG. 18 are connected to the first through fourth transmission lines 43, 44, 46, 47 which have the same common mode current flow direction, and the lead 453 is connected to wire 52. Specifically, one end, 4511 and 4521, of the leads of the common mode choke coil 450 is connected to the first and second transmission lines 43 and 44, respectively, of FIG. 3. The other end, 4512 and 4522, of the leads of the common mode choke coil 450 is connected to the third and fourth transmission lines 46 and 47, respectively. One end 4531 of the lead of the common mode choke coil 450 is connected to the first and second terminators 50 and 51, and the other end is connected to a ground. The first through fourth transmission lines 43, 44, 46, 47 of FIG. 3, and the wire 52 from the other end of the first and second terminators 50 and 51, have common mode current flowing in opposite directions. Therefore, one end 4532 of the lead of FIG. 18 is connected to the wire 52 of FIG. 3. One end 4531 of the lead of FIG. 18 is connected to a stable electric potential.

Figure 19:
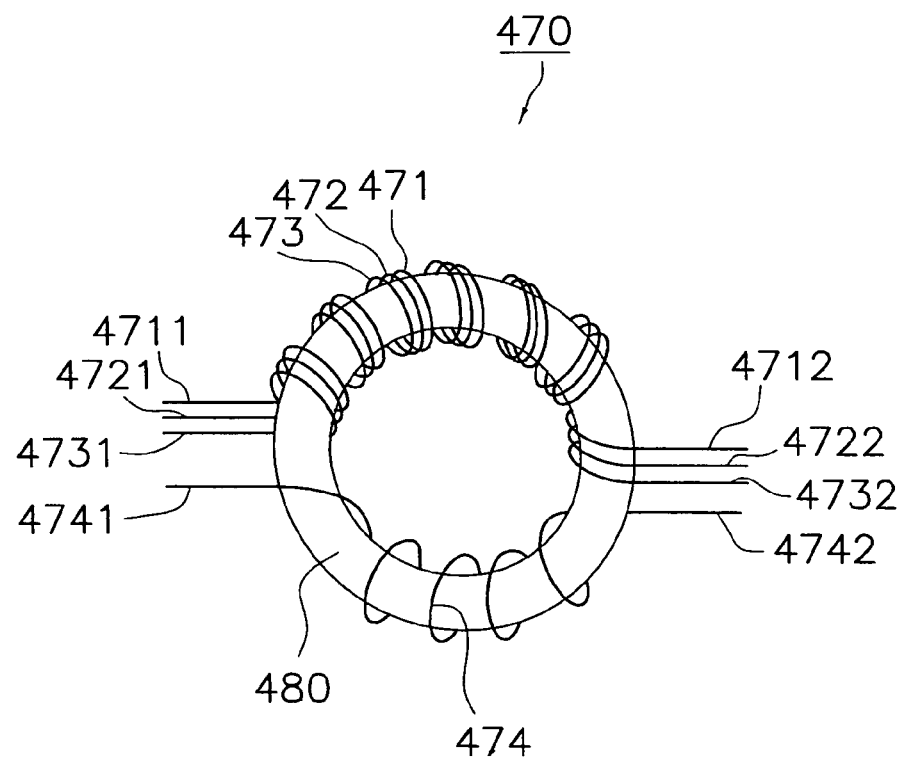
FIG. 19 shows another example of the common mode choke coil of the ninth embodiment.

The leads of the common mode choke coil 450 of the ninth embodiment may have one lead and a plurality of leads wound in opposite directions. An example of one lead and three leads wound in mutually opposite directions is shown in FIG. 19.

The common mode choke coil 450 with this structure is applicable to the differential transmission circuit 41 of FIG. 3. Since the lead 45c is connected to the first and second terminators 50 and 51 from the signal output side, the wiring can be shorter between the first and second terminators 50 and 51 and the common mode choke coil 450.

(10) Tenth Embodiment

Figure 20:
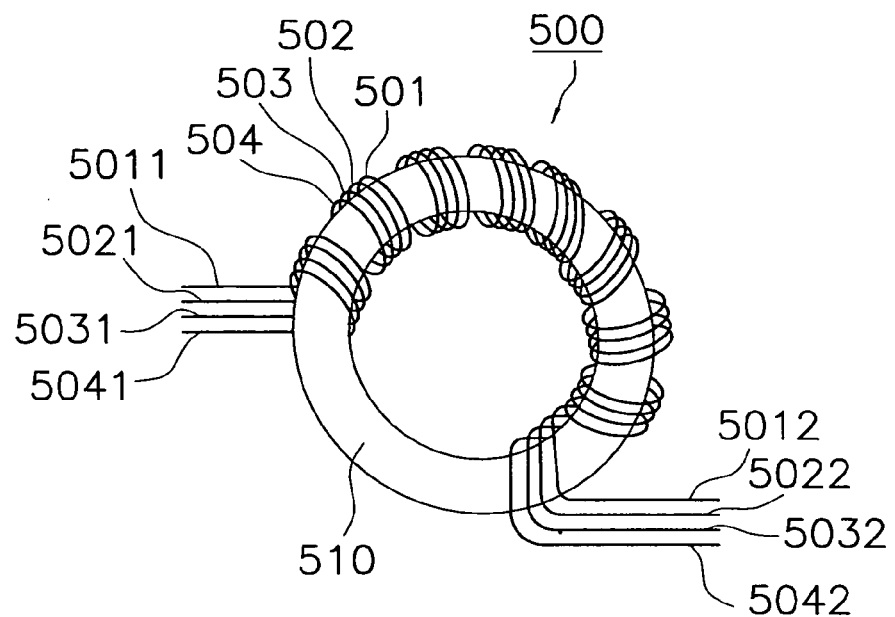
FIG. 20 shows the common mode choke coil of the tenth embodiment.

FIG. 20 illustrates a common mode choke coil of a tenth embodiment of the present invention. The common mode choke coil 500 of FIG. 19 may be used in the differential transmission circuits 101, 121, 161, and 181 of the sixth embodiment (FIGS. 6, 7, 9, 10).

The common mode choke coil 500 of FIG. 20 includes a magnetic body 510, and four leads 501, 502, 503, 504. The four leads 501, 502, 503, 504 are all wound in the same direction on the magnetic body 510.

Figure 21:
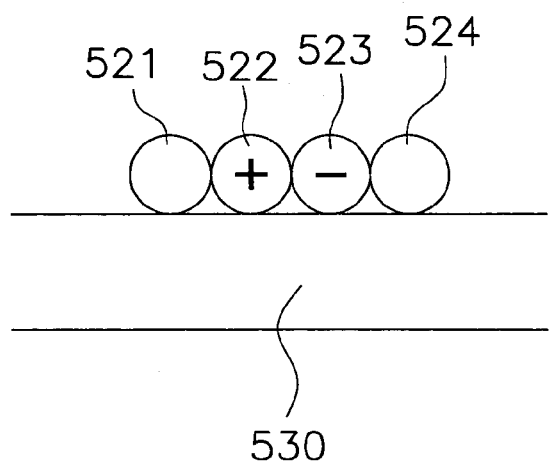
FIG. 21 shows an example of a cross section of the common mode choke coil of FIG. 20.

FIG. 21 is a cross section view of the common mode choke coil 500 of FIG. 20. FIG. 21 is a vertical cross section view of the common mode choke coil 50 of FIG. 20 relative to the winding direction of the leads 501, 502, 503, 504. In FIG. 21, the common mode choke coil 500 has a positive lead 522 and a negative lead 523 wound adjacent to one another on the surface of a magnetic body 530. The positive lead 522 and negative lead 523 are sandwiched between the wound leads 521 and 524 which are connected to a stable electric potential.

The positive lead 522 and the negative lead 523 transmit signals having mutually reverse phases. That is, the positive lead 522 transmits normal phase signals, and negative lead 523 transmits reverse phase signals. Accordingly, it is preferred that the positive lead 522 is connected to the first and third transmission lines, and the negative lead 523 is connected to the second and fourth transmission lines. The leads 521 and 524 are connected to a stable potential such as a ground. Accordingly, the leads 521 and 524 may be connected to the first and second terminators, and first and second shields.

In the common mode choke coil with lead windings as shown in FIG. 21, the positive lead and negative lead, which are connected to transmission lines and in which mutually reverse phase signals flow, are normally adjacent. The positive and negative leads are arranged so as to be sandwiched between leads connected to a stable potential, such as a ground. There is a stable match of the impedances between the leads connected to a stable potential such as a ground, and the individual leads connected to transmission lines. Accordingly, signals can be transmitted while maintaining excellent signal quality.

Figure 22:
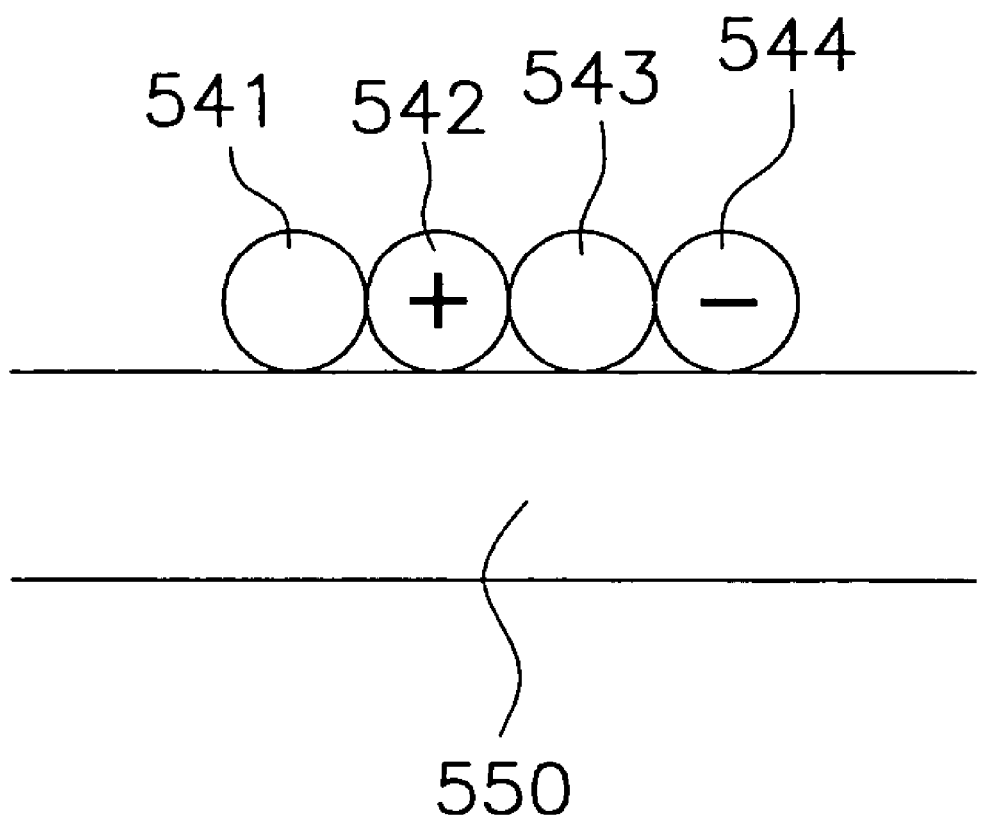
FIG. 22 shows another example of a cross section of the common mode choke coil of FIG. 20.
Figure 23:
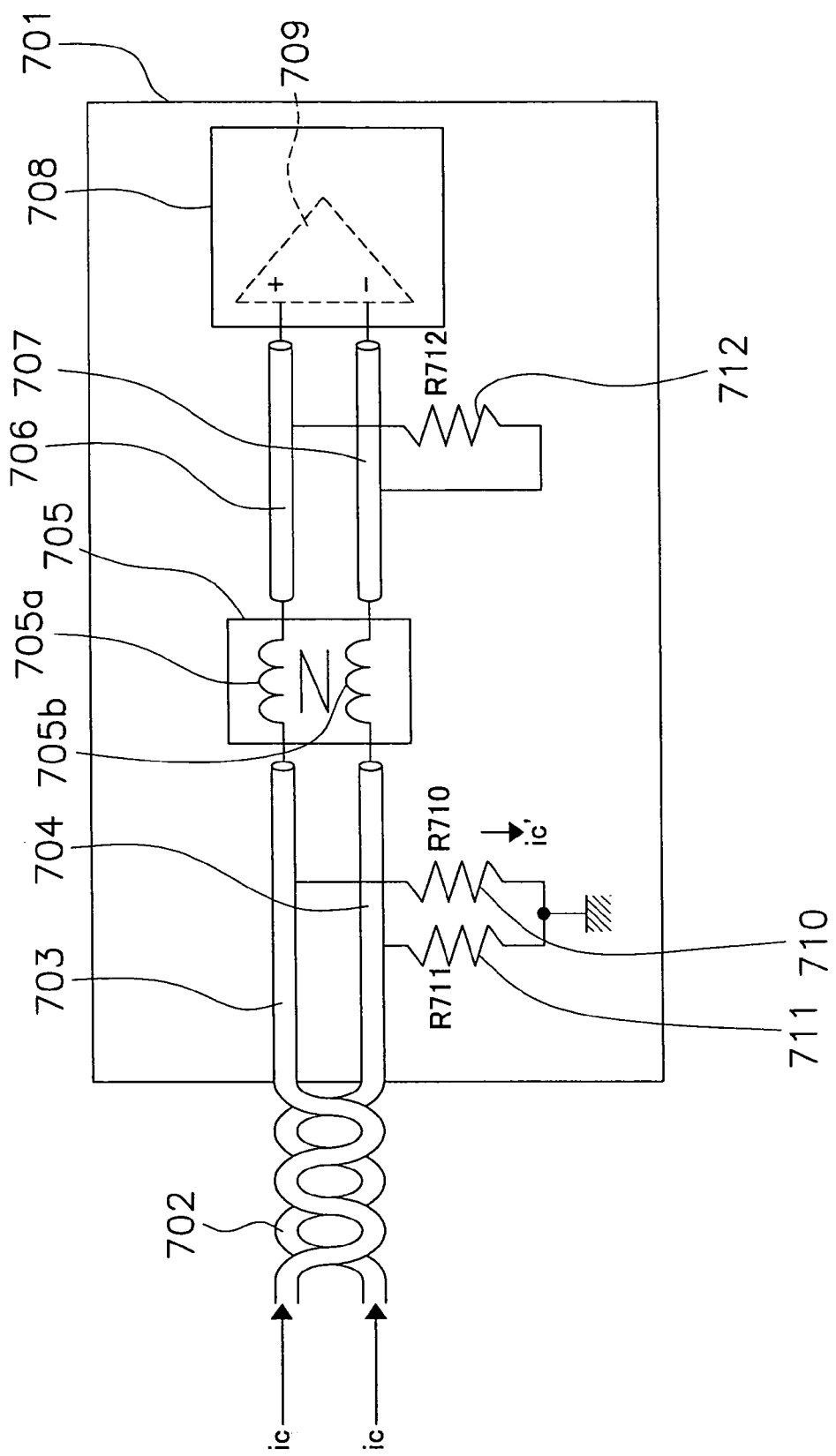
FIG. 23 is a diagram of the signal reception circuit of patent citation 1.
Figure 24:
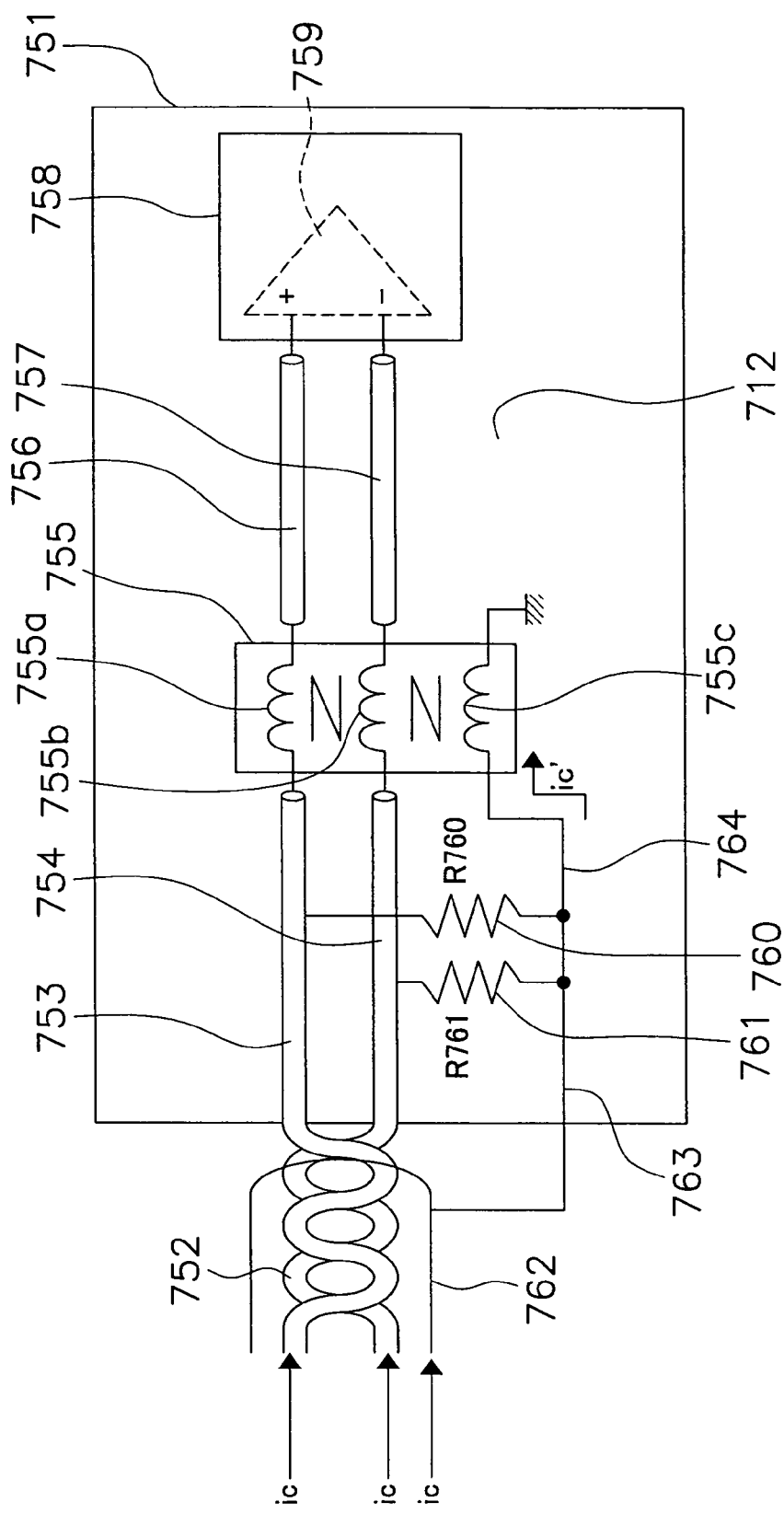
FIG. 24 is a diagram of the signal reception circuit of patent citation 2.
Figure 25:
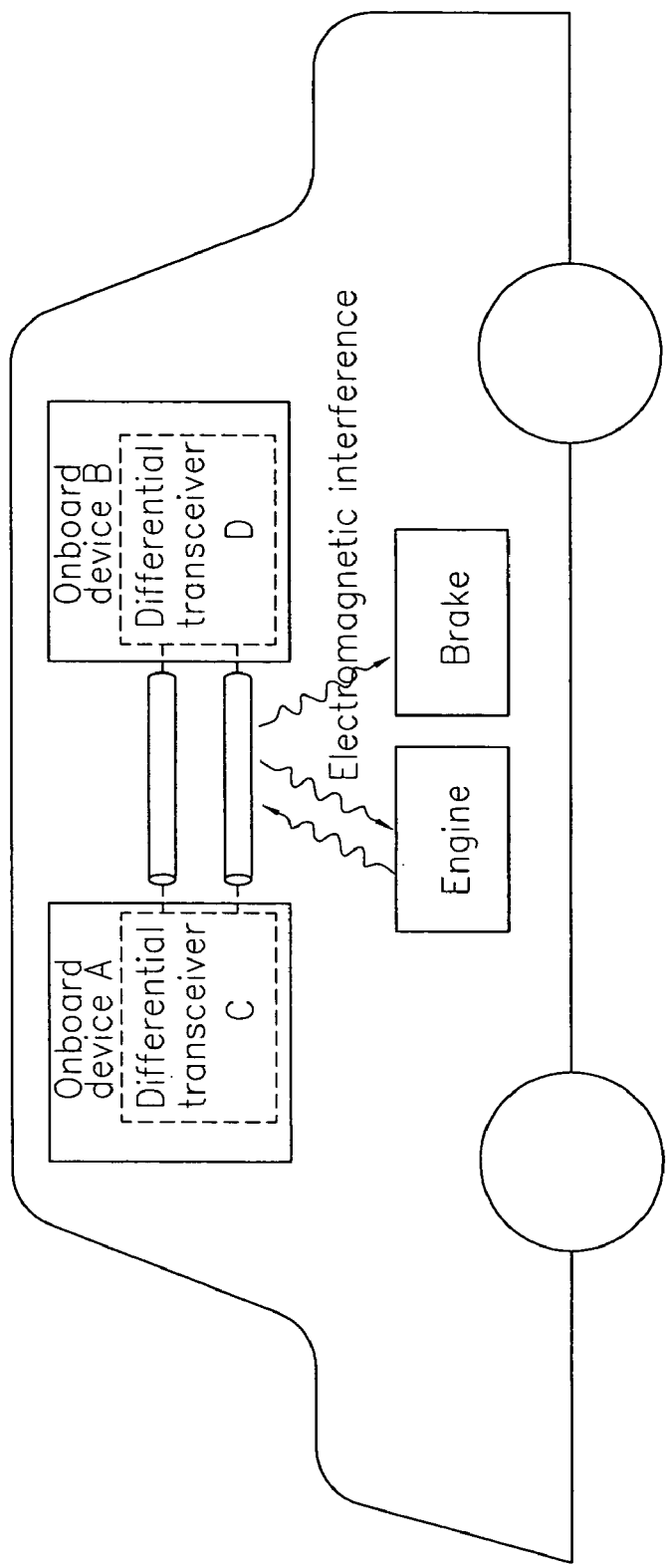
FIG. 25 shows the conventional problems when a differential transmission circuit is installed in a vehicle.

FIG. 22 is a cross section view of the common mode choke coil 500 of FIG. 20. FIG. 22 is a vertical cross section view of the common mode choke coil 50 of FIG. 20 relative to the winding direction of the leads 501, 502, 503, 504. In FIG. 22, the common mode choke coil 500 has a positive lead 542 and a negative lead 544, and leads 541 and 543 which are connected to a stable potential alternatingly arranged and wound on the surface of a magnetic body 550. The leads which transmit signals are not adjacent.

The positive lead 542 and negative lead 544 transmit signals having mutually reverse phases. That is, the positive lead 542 transmits normal phase signals, and the negative lead 544 transmits reverse phase signals. Accordingly, it is preferred that the positive lead 542 is connected to the first and third transmission lines, and the negative lead 544 is connected to the second and fourth transmission lines. The leads 541 and 543 are connected to a stable electric potential such as a ground. Accordingly, the leads 541 and 544 may be connected to the first and second terminator, and first and second shields.

The common mode choke coil with lead windings as shown in FIG. 22 is ideally suited for pseudo differential transmission such as HDMI (high-definition multimedia interface). Pseudo differential transmission is a transmission method in which a differential driver alternatingly outputs normal phase differential signals and reverse phase differential signals. The stable electric potential may be, for example, a ground. The individual leads wires connected to the first and second transmission lines of the differential transmission circuit are adjacent to individual leads connected to a ground. Therefore, the individual leads connected to the first and second transmission circuits are strongly coupled to the ground, which is a return path for the first and second signals, so as to suppress electromagnetic interference. Since there is a stable match of the impedances between the leads connected to the ground and the leads connected to the first and second transmission lines, transmission can occur while maintaining excellent signal quality.

Although the common mode choke coil of the present invention has been described in terms of three and four leads, five or more leads may be used. That is, the common mode choke coil of the present invention includes N number of leads.

The differential transmission circuit of the present invention is applicable to LAN in the field of consumer appliances. The differential transmission circuit of the present invention is particularly applicable in environments in which there is a high level of external noise from mobile LAN and the like.

This application claims priority to Japanese Patent Application No. 2004-098930. The entire disclosure of Japanese Patent Application No. 2004-098930 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A common mode choke coil used in a differential transmission circuit, the differential transmission circuit comprising:

a first transmission line for transmitting a first signal;

a second transmission line for transmitting a second signal having the reverse phase of the first signal;

the common mode choke coil connected in series with each of the first transmission line and the second transmission line;

a third transmission line for transmitting the first signal output from the common mode choke coil, and connected in series with the common mode choke coil;

a fourth transmission line for transmitting the second signal output from the common mode choke coil, and connected in series with the common mode choke coil;

a semiconductor device for receiving and transmitting the first signal and the second signal, and connected in series with the third transmission line and the fourth transmission line;

a first terminator, one end of which is connected in parallel with the first transmission line or the third transmission line, and the other end of which is connected to a stable electric potential via the common mode choke coil; and a second terminator, one end of which is connected in parallel with the second transmission line or the fourth transmission line, and the other end of which is connected to the stable electric potential via the common mode choke coil, the common mode choke coil comprising:

a magnetic body; and three leads wound on the magnetic body, wherein two leads among the three leads are wound on a surface of the magnetic body forming a first layer, and the remaining lead among the three leads is wound on top of the two leads forming the first layer so as to form a second layer, wherein the two leads transmit the first signal and the second signal having mutually reverse phases, and the remaining lead forming the second layer is connected to the stable electric potential, and wherein the center of a cross section of the remaining lead forming the second layer is everywhere equidistant from the centers of a cross section of the two leads forming the first layer.

2. The common mode choke coil of claim 1, wherein one of the two leads and the remaining lead are wound in a mutually opposite direction.

3. An audio-video transceiver for in-vehicle installation connected to an output device, the audio-video transceiver comprising:

a differential transmission circuit including:

a first transmission line for transmitting a first signal;

a second transmission line for transmitting a second signal having the reverse phase of the first signal;

a common mode choke coil connected in series with each of the first transmission line and the second transmission line, the common mode choke coil including:

a magnetic body; and three leads wound on the magnetic body, wherein two leads among the three leads are wound on a surface of the magnetic body forming a first layer, and the remaining lead among the three leads is wound on top of the two leads forming the first layer so as to form a second layer, wherein the two leads transmit the first signal and the second signal having mutually reverse phases, and the remaining lead forming the second layer is connected to the stable electric potential, and wherein the center of a cross section of the remaining lead forming the second layer is everywhere equidistant from the centers of a cross section of the two leads forming the first layer;

a third transmission line for transmitting the first signal output from the common mode choke coil, and connected in series with the common mode choke coil;

a fourth transmission line for transmitting the second signal output from the common mode choke coil, and connected in series with the common mode choke coil;

a semiconductor device for receiving and transmitting the first signal and the second signal, and connected in series with the third transmission line and the fourth transmission line;

a first terminator, one end of which is connected in parallel with the first transmission line or the third transmission line, and the other end of which is connected to a stable electric potential via the common mode choke coil; and a second terminator, one end of which is connected in parallel with the second transmission line or the fourth transmission line, and the other end of which is connected to the stable electric potential via the common mode choke coil; and a control means for outputting a signal transmitted from the differential transmission circuit to the output device.

* * * * *